(12) United States Patent
Ho et al.

(10) Patent No.: US 7,899,012 B2
(45) Date of Patent: Mar. 1, 2011

(54) VIRTUAL STREAMS FOR QOS-DRIVEN WIRELESS LANS

(75) Inventors: Jin-Meng Ho, Parsippany, NJ (US); Wei Lin, Parsippany, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 12/647,531

(22) Filed: Dec. 27, 2009

(65) Prior Publication Data

US 2010/0103915 A1 Apr. 29, 2010

Related U.S. Application Data

(63) Continuation of application No. 11/443,930, filed on May 31, 2006, now Pat. No. 7,664,072, which is a continuation of application No. 09/617,083, filed on Jul. 14, 2000, now Pat. No. 7,151,762.

(51) Int. Cl.
*H04W 4/00* (2009.01)

(52) U.S. Cl. .................. 370/329; 370/338; 370/395.21; 370/449; 370/453

(58) Field of Classification Search .................. 370/338, 370/328, 449, 395.21; 455/403, 453
See application file for complete search history.

(56) References Cited

U.S. PATENT DOCUMENTS

| | | |
|---|---|---|
| 4,295,217 A | 10/1981 | Fennell |
| 5,012,469 A | 4/1991 | Sardana |
| 5,303,234 A | 4/1994 | Kou |
| 5,384,777 A | 1/1995 | Ahmadi et al. |
| 5,506,848 A | 4/1996 | Drakopoulos |
| 5,581,544 A | 12/1996 | Hamada et al. |
| 5,594,720 A | 1/1997 | Papadopoulos |
| 5,623,495 A | 4/1997 | Eng et al. |
| 5,634,204 A | 5/1997 | Takahashi et al. |
| 5,638,371 A | 6/1997 | Raychaudhuri et al. |
| 5,644,576 A | 7/1997 | Bauchot et al. |
| 5,644,715 A | 7/1997 | Baugher |

(Continued)

FOREIGN PATENT DOCUMENTS

EP 0853407 7/1998

(Continued)

OTHER PUBLICATIONS

Aad, Imat & Castelluccia, Claude, "Introducing Service Differentiation into IEEE 802.11", IEEE, 2000, pp. 438-443.

(Continued)

*Primary Examiner*—CongVan Tran

(57) ABSTRACT

A virtual stream (VS) in a basic service set (BSS) in a wireless local area network (WLAN) that exists solely within the medium access control (MAC) sublayer of the WLAN. The VS includes a unidirectional path in the wireless network between a station sourcing a quality of service (QoS) session and at least one station receiving the QoS session in the same BSS. The VS is defined by a VS identifier (VSID) that is unique within and local to the BSS, an address of the sourcing station, and an address of the at least one receiving station. The VS can be a virtual down-stream (VDS), a virtual up-stream (VUS) or a virtual side-stream (VSS). The VS can be a unitcast or a multicast VS.

20 Claims, 12 Drawing Sheets

U.S. PATENT DOCUMENTS

| | | | |
|---|---|---|---|
| 5,717,688 A | 2/1998 | Belanger et al. | |
| 5,729,531 A | 3/1998 | Raith | |
| 5,729,542 A | 3/1998 | Dupont | |
| 5,752,193 A | 5/1998 | Scholefield et al. | |
| 5,787,080 A | 7/1998 | Hulyalkar et al. | |
| 5,793,747 A | 8/1998 | Kline | |
| 5,875,186 A | 2/1999 | Belanger et al. | |
| 5,883,884 A | 3/1999 | Atkinson | |
| 5,886,993 A | 3/1999 | Ruszczyk | |
| 5,892,769 A | 4/1999 | Lee | |
| 5,896,385 A | 4/1999 | Achilleoudis | |
| 5,949,768 A | 9/1999 | Citta et al. | |
| 5,953,344 A | 9/1999 | Dall | |
| 5,960,000 A | 9/1999 | Ruszczyk et al. | |
| 5,963,557 A | 10/1999 | Eng | |
| 5,970,062 A | 10/1999 | Bauchot | |
| 5,978,382 A | 11/1999 | Citta et al. | |
| 5,982,748 A | 11/1999 | Yin et al. | |
| 6,034,967 A | 3/2000 | Citta et al. | |
| 6,049,549 A | 4/2000 | Ganz et al. | |
| 6,115,390 A | 9/2000 | Chuah | |
| 6,119,214 A | 9/2000 | Dirks | |
| 6,151,329 A | 11/2000 | Berrada et al. | |
| 6,169,748 B1 | 1/2001 | Barbas et al. | |
| 6,172,971 B1 | 1/2001 | Kim | |
| 6,181,684 B1 | 1/2001 | Turcotte et al. | |
| 6,226,277 B1 | 5/2001 | Chuah | |
| 6,236,656 B1 | 5/2001 | Westerberg et al. | |
| 6,240,083 B1 | 5/2001 | Wright et al. | |
| 6,262,976 B1 | 7/2001 | McNamara | |
| 6,263,204 B1 | 7/2001 | Kusaki et al. | |
| 6,283,204 B1 | 9/2001 | Brady et al. | |
| 6,285,886 B1 | 9/2001 | Kamel et al. | |
| 6,317,438 B1 | 11/2001 | Trebes, Jr. | |
| 6,327,254 B1 | 12/2001 | Chuah | |
| 6,356,555 B1 | 3/2002 | Rakib et al. | |
| 6,366,577 B1 | 4/2002 | Donovan | |
| 6,370,153 B1 | 4/2002 | Eng | |
| 6,377,548 B1 | 4/2002 | Chuah | |
| 6,404,738 B1 | 6/2002 | Reininger et al. | |
| 6,407,992 B1 | 6/2002 | Pasternak et al. | |
| 6,411,611 B1 | 6/2002 | van der Tuijn | |
| 6,445,701 B1 | 9/2002 | Bahl | |
| 6,449,484 B1 | 9/2002 | Grubeck | |
| 6,452,915 B1 | 9/2002 | Jorgensen | |
| 6,469,991 B1 | 10/2002 | Chuah | |
| 6,501,741 B1 | 12/2002 | Mikkonen et al. | |
| 6,507,587 B1 | 1/2003 | Bahl | |
| 6,515,972 B1 | 2/2003 | Gage et al. | |
| 6,519,462 B1 | 2/2003 | Lu et al. | |
| 6,529,520 B1 | 3/2003 | Lee et al. | |
| 6,538,985 B1 | 3/2003 | Petry | |
| 6,538,989 B1 | 3/2003 | Carter et al. | |
| 6,542,490 B1 | 4/2003 | Ahmadvand et al. | |
| 6,543,053 B1 | 4/2003 | Li et al. | |
| 6,563,793 B1 | 5/2003 | Golden et al. | |
| 6,567,408 B1 | 5/2003 | Li et al. | |
| 6,567,416 B1 | 5/2003 | Chuah | |
| 6,577,609 B2 | 6/2003 | Sharony | |
| 6,587,453 B1 | 7/2003 | Romans et al. | |
| 6,587,457 B1 | 7/2003 | Mikkonen | |
| 6,587,465 B1 | 7/2003 | Dempo | |
| 6,590,885 B1 | 7/2003 | Jorgensen | |
| 6,597,682 B1 | 7/2003 | Kari | |
| 6,600,744 B1 | 7/2003 | Carr et al. | |
| 6,625,156 B2 | 9/2003 | Shaio et al. | |
| 6,628,629 B1 | 9/2003 | Jorgenson | |
| 6,631,122 B1 | 10/2003 | Arunachalam et al. | |
| 6,640,248 B1 | 10/2003 | Jorgensen | |
| 6,657,965 B1 | 12/2003 | Shaffer et al. | |
| 6,657,981 B1 * | 12/2003 | Lee et al. | 370/331 |
| 6,680,922 B1 * | 1/2004 | Jorgensen | 370/328 |
| 6,704,321 B1 | 3/2004 | Kamiya | |
| 6,704,932 B1 | 3/2004 | Matsunaga et al. | |
| 6,708,034 B1 | 3/2004 | Sen et al. | |
| 6,728,365 B1 | 4/2004 | Li et al. | |
| 6,738,361 B1 | 5/2004 | Immonen et al. | |
| 6,741,576 B1 | 5/2004 | Alimi et al. | |
| 6,747,959 B1 | 6/2004 | Ho | |
| 6,747,968 B1 | 6/2004 | Seppala et al. | |
| 6,754,176 B1 | 6/2004 | Gubbi et al. | |
| 6,765,872 B1 | 7/2004 | Tazaki | |
| 6,785,252 B1 | 8/2004 | Zimmerman et al. | |
| 6,788,950 B1 | 9/2004 | Raissinia et al. | |
| 6,804,222 B1 | 10/2004 | Lin | |
| 6,850,918 B1 | 2/2005 | Burchetta et al. | |
| 6,850,981 B1 | 2/2005 | Ho | |
| 6,862,270 B1 | 3/2005 | Ho | |
| 6,862,622 B2 | 3/2005 | Jorgensen | |
| 6,898,194 B1 | 5/2005 | Vedrine | |
| 6,931,448 B2 | 8/2005 | Holler et al. | |
| 6,934,752 B1 | 8/2005 | Gubbi | |
| 6,950,397 B1 | 9/2005 | Ho | |
| 6,963,545 B1 | 11/2005 | Ho | |
| 6,970,422 B1 | 11/2005 | Ho | |
| 6,999,442 B1 | 2/2006 | Ho | |
| 7,031,287 B1 | 4/2006 | Ho | |
| 7,039,032 B1 | 5/2006 | Ho | |
| 7,046,680 B1 | 5/2006 | McDysan et al. | |
| 7,050,459 B2 | 5/2006 | Kandala | |
| 7,068,632 B1 | 6/2006 | Ho | |
| 7,068,633 B1 | 6/2006 | Ho | |
| 7,079,508 B2 | 7/2006 | Ayyagari et al. | |
| 7,151,762 B1 | 12/2006 | Ho | |
| 7,151,781 B2 | 12/2006 | MeLampy et al. | |
| 7,298,724 B2 | 11/2007 | Lin | |
| 7,359,971 B2 | 4/2008 | Jorgensen | |
| 7,403,538 B1 | 7/2008 | Ho | |
| 7,423,971 B1 | 9/2008 | Mohaban et al. | |
| 7,450,504 B1 | 11/2008 | Ho | |
| 7,466,660 B2 | 12/2008 | Pani et al. | |
| 7,466,705 B2 | 12/2008 | Saito et al. | |
| 7,630,351 B1 | 12/2009 | Ho et al. | |
| 7,639,657 B1 | 12/2009 | Ho et al. | |
| 7,646,756 B1 | 1/2010 | Ho et al. | |
| 7,664,068 B1 | 2/2010 | Ho et al. | |
| 7,664,072 B1 | 2/2010 | Ho et al. | |
| 7,738,378 B1 | 6/2010 | Ho et al. | |
| 7,756,378 B2 | 7/2010 | Lin et al. | |
| 2001/0024434 A1 | 9/2001 | Ayyagari et al. | |
| 2002/0075857 A1 | 6/2002 | LeBlanc | |
| 2002/0150062 A1 | 10/2002 | Zheng et al. | |
| 2002/0159418 A1 | 10/2002 | Rudnick et al. | |
| 2002/0163928 A1 | 11/2002 | Rudnick et al. | |
| 2002/0194130 A1 | 12/2002 | Maegawa et al. | |
| 2003/0058827 A1 | 3/2003 | Chow et al. | |
| 2003/0086515 A1 | 5/2003 | Trans et al. | |
| 2003/0198248 A1 | 10/2003 | Pronk | |
| 2004/0095914 A1 | 5/2004 | Katsube et al. | |
| 2005/0002420 A1 | 1/2005 | Jeanne et al. | |
| 2006/0109829 A1 | 5/2006 | O'Neill | |
| 2008/0013544 A1 | 1/2008 | Ginde et al. | |
| 2008/0049761 A1 | 2/2008 | Lin et al. | |
| 2008/0137625 A1 | 6/2008 | Hori et al. | |

FOREIGN PATENT DOCUMENTS

| | | |
|---|---|---|
| JP | 02072736 | 3/1990 |
| WO | WO-0031929 | 6/2000 |

OTHER PUBLICATIONS

Ganz, Aura & Wongthavarawat, Kitti, "IEEE 802.11 Wireless LAN Association Procedure for Multimedia Applications", IEEE, 1999, pp. 1287-1291.

Ho, Jin-Meng & Lin, Wei, "IEEE P802.11 Wireless LANs, MediaPlex-An IEEE 802.11 Enhanced Protocol for QoS-Driven Wireless LANs", AT&T, Nov. 2000, pp. 1-25.

Gong, Zhijun et al., "QoS Guaranteed Wireless LAN" International Conference on Communication Technology, ICCT, Oct. 22-24, 1998.

N. Ek, "IEEE 802.1 P,Q—QoS on the MAC level," Apr. 24, 1999, XP000864158 Retrieved from the Internet: URL:Http://www.tml.hut.fi/Opinnot/Tik-110.551/1999/papers/08IEEE802.1Qosl- nMac/qos.html retrieved Jun. 27, 2002, paragraphs 0003-0006.

Y. Drabu, "A survey of QoS techniques in 802.11", Internet 'Online! Jan. 1999, XP000864159, Retrieved from the Internet: URL:http://trident.mcs.kent.edu/ydrabu/research/wmac/mac.pdf, retrieved on Jun. 27, 2002, paragraphs 0001-03.21, 0004-4.2.1.

R. Yavatkar et al., "SBM: A Protocol for RSVP-based Admission Control over IEEE-802-style Networks", Internet Engineering Task Force, RFC 2814, May 2000.

R. Braden, "Resource Reservation Protocol (RSVP) ver. 1 " Internet Engineering Task Force, RFC 2205, Sep. 1997.

Cali et al. "IEEE 802.11 Wireless LAN: Capacity Analysis and Protocol Enhancement," IEEE, 0-7803-4386-7/98, pp. 1-8, 1998.

\* cited by examiner

FIG. 11b

CONTENTION CONTROL (CC) FRAME

| FRAME CONTROL | DURATION/ID | BSS ID | PERMISSION PROBABILITY | FEEDBACK COUNT | FEEDBACK ENTRIES |
|---|---|---|---|---|---|
| | PRIORITY LIMIT / CCI LENGTH | | | | FC * AIDs/VSIDs |

FIG. 11c

RESERVATION REQUEST (RR) FRAME

| FRAME CONTROL | DURATION/ID | BSS ID | TA | AID/VSID | FCS |
|---|---|---|---|---|---|
| | VS SIZE | | | | |

VIRTUAL STREAMS FOR QOS-DRIVEN WIRELESS LANS

CROSS-REFERENCE TO RELATED APPLICATIONS

This application is a continuation of application Ser. No. 11/443,930, entitled "Virtual Streams for QoS-Driven Wireless LANS," filed on May 31, 2006 now U.S. Pat. No. 7,664,072, which is currently allowed and is a continuation of application Ser. No. 09/617,083, entitled "Virtual Streams for QoS-Driven Wireless LANS," filed on Jul. 14, 2000 now U.S. Pat. No. 7,151,762, where all of the above cited applications are herein incorporated by reference in their entirety.

The present application is related to application Ser. No. 09/616,900, entitled An Architectural Reference Model for QoS-Driven Wireless LANs, invented by J.-M. Ho, and to application Ser. No. 10/917,951, entitled An In-Band Qos Signaling Reference Model for QoS-Driven Wireless LANs, invented by W. Lin and J.-M. Ho, and to application Ser. No. 09/616,897, entitled Admission Control for QoS-Driven Wireless LANs, invented by W. Lin and J.-M. Ho, and to application Ser. No. 09/616,896, entitled Frame Classification for QoS-Driven Wireless LANs, invented by J.-M. Ho and W. Lin, and to application Ser. No. 09/617,493, entitled Frame Scheduling for QoS-Driven Wireless LANs, invented by J.-M. Ho and W. Lin; and to application Ser. No. 09/617,494, entitled RSVP-SBM Based Down-Stream Session Setup, Modification, and Teardown for Qos-Driven Wireless LANS, invented by J.-M. Ho and W. Lin; and to application Ser. No. 09/616,878, entitled RSVP/SBM Based Up-Stream Session Setup, Modification, and Teardown for QoS-Driven Wireless LANs, invented by J.-M. Ho and W. Lin; and to application Ser. No. 09/617,440, entitled RSVP/SBM Based Side-Stream Session Setup, Modification, and Teardown for QoS-Driven Wireless LANs, invented by J.-M. Ho and W. Lin; and to application Ser. No. 09/616,885, entitled Enhanced Channel Access Mechanisms for QoS-Driven Wireless LANs, invented by J.-M. Ho; and to application Ser. No. 09/617,439, entitled Centralized Contention and Reservation Request for QoS-Driven Wireless LANs, invented by J.-M. Ho and W. Lin; and to application Ser. No. 09/616,884, entitled Multipoll for QoS-Driven Wireless LANs, invented by J.-M. Ho and W. Lin; each of which is incorporated by reference herein. Additionally, the present application is related to application Ser. No. 09/596,712, entitled Voice-Data Integrated Multiaccess By Self-Reservation and Blocked Binary Tree Resolution, invented by J.-M. Ho and filed Jun. 19, 2000; and application Ser. No. 09/597,392, entitled Voice-Date Integrated Multiaccess By Self-Reservation and Stabilized Aloha Contention, invented by J.-M. Ho, and filed Jun. 19, 2000, each of which is incorporated by reference herein.

BACKGROUND OF THE INVENTION

1. Field of the Invention

The present invention relates to the fields of communications and networking. More particularly, the present invention relates to virtual streams for QoS-driven wireless networks.

2. Description of the Related Art

With the advent of digital broadband networks, such as hybrid fiber-coaxial networks and 3G/4G cellular networks, packetized multimedia services to residential and enterprise environments are becoming not only a reality, but also a necessity. Wireless delivery of, or access to, multimedia applications, such as voice, video and data, is considered viable for helping accelerate this trend.

The transport of multimedia traffic over a shared network generally requires specific levels of quality of service (QoS) support for achieving predictable and satisfactory network service. Technically, QoS refers to the expectation of a session or an application to receive, as well as the ability of a network to provide, a negotiated set of service values for data transmission in terms of delay/jitter bound, mean/maximum data rate, and the like. QoS is enforced and supported by such techniques as effective congestion control, adequate resource reservation, proper traffic shaping, and prioritized bandwidth allocation. With some degree of QoS guarantees, shared channels furnish time-bounded and asynchronous services that are comparable to those of dedicated channels.

Bandwidth utilization efficiency is another important consideration in the design of a multimedia network. High bandwidth utilization efficiency leads to increased channel throughput and reduced access delay, thereby permitting the same channel bandwidth to serve more sessions/applications with given QoS levels. In the case of bandwidth shortage, maximizing bandwidth utilization efficiency minimizes the degradation of QoS values provided to active sessions/applications.

Unfortunately, wireless local-area networks (WLANs), such as currently specified by IEEE P802.11/1999, do not support QoS transport and operate on a distributed contention or simplified polling basis. Consequently, only asynchronous and low-throughput best-effort data services are provided.

What is needed is a technique for transforming a WLAN into part of an end-to-end QoS network having enhanced channel access, thereby providing QoS support with improved bandwidth utilization.

SUMMARY OF THE INVENTION

The present invention provides different types of virtual streams that can be used for QoS support in a WLAN. The advantages of the present invention are provided by a virtual stream (VS) in a basic service set (BSS) in a wireless local area network (WLAN) that exists solely within the medium access control (MAC) sublayer of the WLAN. According to the invention, the VS includes a unidirectional path in the wireless network between a station sourcing a quality of service (QoS) session and at least one station receiving the QoS session in the same BSS. The VS is defined by a VS identifier (VSID) that is unique within and local to the BSS, an address of the sourcing station, and an address of the at least one receiving station. The VS can be a virtual down-stream (VDS), a virtual up-stream (VUS) or a virtual side-stream (VSS). The VS can be a unitcast or a multicast VS.

The VS is set up by a QoS management entity (QME) within a point coordinator (PC) station of the BSS to transport, under at least one predetermined QoS constraint, a traffic of the QoS session from a local logical link control (LLC) entity to at least one peer LLC entity in the same BSS. The VS is torn down by the QME of the PC-station upon termination of the QoS session. The QME also reserves an associated resource of the BSS for the VS set up for the QoS session, such as a predetermined bandwidth of a communication link, and releases the associated resource when the VS is torn down at termination of the QoS session.

BRIEF DESCRIPTION OF THE DRAWING

The present invention is illustrated by way of example and not limitation in the accompanying figures in which like reference numerals indicate similar elements and in which:

FIGS. 11a-11c respectively show exemplary arrangements of a super frame, a contention control frame and a reservation request frame that can be used for centralized contention and reservation request over a QoS-driven WLAN according to the present invention.

DETAILED DESCRIPTION

The present invention provides an architectural reference model that integrates the lower layers (link and PHY layers) of a WLAN, as currently specified by IEEE P802.11/1999, with the higher layers (network and higher layers) that appear in the ISO/IEC basic reference model of OpenSystems Interconnection (OSI) (ISO/IEC 7498-1), but not in IEEE P802.11/1999. Both the IEEE P802.11/1999 and the ISO/IEC 7498-1 standards are incorporated by reference herein. Additionally, the present invention provides end-to-end QoS mechanisms. Such integration instills the QoS parameter values from the higher layers into the lower layers, and enables the lower layers to provide QoS traffic transport and improved channel throughput.

Compared to the existing reference model, as specified in IEEE P802.11/1999, the present invention introduces an admission control entity (ACE), a QoS management entity (QME), a frame classification entity (FCE), and a frame scheduling entity (FSE) for a point coordinator/access point (PC/AP) station (STA). The present invention also introduces a QoS signaling entity (QSE), a QoS management entity (QME), a frame classification entity (FCE), and an optional frame scheduling entity (FSE) for a non-PC/AP STA. The ACE and the QSE may each be part of the QME. Further, the present invention introduces a Virtual Stream (VS) Update management frame for exchange of VS management information between a PC/AP STA and a non-PC/AP STA.

Figure 1:
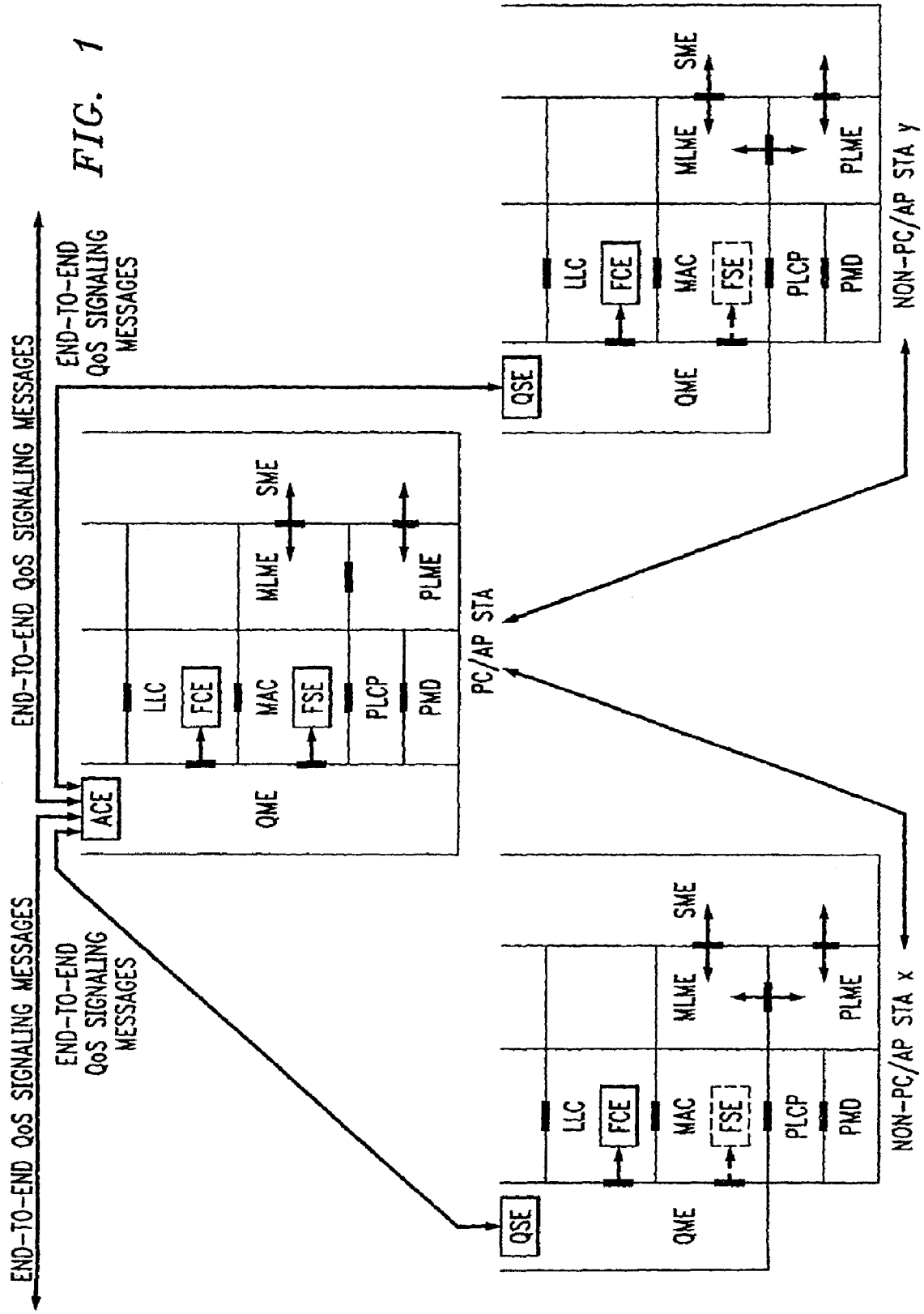
FIG. 1 shows an architectural reference model for QoS support in a basic service set (BSS) over a WLAN according to the present invention.

FIG. 1 shows an architectural reference model for QoS support in a basic service set (BSS) over a WLAN according to the present invention. FIG. 1 shows an exemplary BSS that includes a PC/AP STA and two non-PC/AP STAs x and y. While only two non-PC/AP STAs are shown in FIG. 1, it should be understood that any number of non-PC/AP STAs could be part of the BSS shown in FIG. 1.

The PC/AP STA shown in FIG. 1 includes an admission control entity (ACE) that is part of a QoS management entity (QME). Alternatively, the ACE can be a separate entity that operates in conjunction with the QME. The PC/AP STA also includes a frame classification entity (FCE) that is logically located in a logical link control (LLC) sublayer of the PC/AP STA. The QME interfaces with the FCE, which maintains a frame classification table containing frame classifiers that are used for identifying QoS parameter values associated with a frame. The PC/AP STA further includes a frame scheduling entity (FSE) logically located at a medium access control (MAC) sublayer of the PC/AP STA. The QME interfaces with the FSE, which maintains a frame scheduling table that contains scheduling information for scheduling transmission of frames. The PC/AP STA includes a conventional station management entity (SME), which is separate from the QME. The SME interfaces with a conventional MAC sublayer management entity (MLME) and a conventional physical layer management entity (PLME). The MLME interfaces with the MAC sublayer, whereas the PLME interfaces with a physical layer. The physical layer comprises a conventional physical layer convergence protocol (PLCP) sublayer and a conventional physical medium dependent (PMD) sublayer.

Each non-PC/AP STA includes a local QME that interfaces with a local FCE. The local FCE is logically located at the LLC sublayer of the non-PC/AP STA and maintains a local frame classification table. Each non-PC/AP STA optionally includes a local FSE (shown in a dotted border) that, when included in the non-PC/AP STA, is logically located at the MAC sublayer of the non-PC/AP STA, and maintains a local frame scheduling table for the non-PC/AP STA. Each non-PC/AP STA includes a conventional station management entity (SME), which is separate from the local QME. The SME of the non-PC/AP STA interfaces with a conventional MLME and a conventional PLME. The MLME interfaces with the MAC sublayer, whereas the PLME interfaces with a physical layer. The physical layer comprises a conventional physical layer convergence protocol (PLCP) sublayer and a conventional physical medium dependent (PMD) sublayer.

End-to-end QoS signaling messages of a session or an application (session/application) are generated by the QSEs of STAs in a BSS of a WLAN and/or from outside the BSS. The end-to-end QoS signaling messages may indicate whether a session/application is being set up, modified, or torn down. The ACE of the PC/AP STA, which may include a module for resource control and a module for policy control (not separately shown in FIG. 1), exchanges end-to-end QoS signaling messages with the QSEs in the BSS and/or other QoS signaling counterparts outside the BSS that are transparent to the lower layers. Based on the end-to-end QoS signaling messages and local policy, the ACE makes an admission control decision for a session/application that is being set up.

When a session/application is admitted, the resource reserved for the admission will be reflected in the ACE, whereas the QME of the PC/AP STA establishes virtual streams (VSs) for transporting the session/application traffic from a local LLC sublayer entity to one or more peer LLC entities. Established VSs become active VSs and are identified by virtual stream identifiers (VSIDs). The QME of the PC/AP STA further extracts a frame classifier(s) from the end-to-end QoS messages for each admitted session/application, where a frame classifier is a set of classification parameters that can be used for identifying the QoS parameter values associated with the frame. Exemplary classification parameters include IP classification parameters, LLC classification parameters and IEEE802.1 P/Q parameters.

The QME of the PC/AP STA passes to the FCE of the PC/AP STA the VSID and the corresponding frame classifier that are defined for the down-stream traffic (traffic from PC/AP STA to non-PC/AP STA) of a newly admitted session/application. The FCE adds the VSID and classifier that are defined for the down-stream, up-stream (from non-PC/AP STA to PC/AP STA) and side-stream (from non-PC/AP STA to non-PC/AP STA) traffic to the classification table, which is a table of all active classifiers that are paired with or contain VSIDs arranged in a defined order. The QME of the PC/AP STA also passes to the FSE of the PC/AP STA the VSID and the corresponding QoS parameter values. Logically, the FSE maintains the VSIDs and associated QoS parameter values, plus other information, such as data size, in a scheduling table.

Further, the QME of the PC/AP STA causes the PC/AP STA to send a management frame, referred to as a VS Update frame, to each non-PC/AP STA participating in a newly admitted session/application. The VS Update management frame contains information, such as VSID, frame classifier, VS Action (i.e., Add VS) and QoS parameter values, that defines the down-stream, up-stream or side-stream traffic of the session/application. After a non-PC/AP STA receives the information contained in a VS Update management frame and passes the information to its local QME, the local QME relays to the local FCE of the non-PC/AP STA the VSID and classifier, and to the local FSE (if any) of the non-PC/AP STA the VSID and QoS parameter values, for the up-stream or side-stream traffic.

An FCE, whether located within the PC/AP STA or a non-PC/AP STA, classifies frames passed down to the LLC sublayer to a VSID. The FSE of the PC/AP STA schedules transmission opportunities (TOs) for frames classified to specific VSIDs based on the QoS parameter values associated with the VSIDs. The FSE of a non-PC/AP STA chooses data frames from its active VSs based on the QoS parameter values of those particular VSs for transmission over the TOs scheduled by the PC/AP STA.

When the QME of the PC/AP STA detects from end-to-end QoS signaling messages received by the ACE a change of QoS parameter values for an admitted session/application, the ACE makes a new admission control decision regarding the "changed" QoS parameter values. When the change cannot be accepted, the QME takes no action for the PC/AP STA and the non-PC/AP STAs participating in the session/application. When the change is accepted, the resource reserved for the modified QoS parameter values will be reflected in the ACE, and the QME updates the FSE of the PC/AP STA with the new QoS parameter values using the admitted VSIDs for the session/application. The QME further causes the PC/AP STA to send another VS Update management frame to each non-PC/AP STA participating in the modified session/application. The VS Update frame contains information relating to the admitted VSID, the VS Action (i.e., Modify VS), and the new QoS parameter values. After a participating non-PC/AP STA receives a second type of VS Update frame, and the non-PC/AP STA passes the information contained therein to its local QME. The local QME updates the local FSE (if any) of the non-PC/AP STA with the VSID and the modified QoS parameter values for the up-stream or side-stream traffic of the session/application. Subsequently, the FSEs of both the PC/AP STA and the non-PC/AP STA (if any) schedule VS transmissions based on the modified QoS parameter values.

When the QME of the PC/AP STA detects from end-to-end QoS signaling messages received by the ACE a termination of an admitted session/application, the resource released by the termination will be reflected in the ACE, whereas the QME identifies the particular VSIDs established for the session/application. The QME of the PC/AP STA instructs the FCE of the PC/AP STA to remove from the classification table the VSID and the corresponding frame classifier associated with the down-stream traffic of the session/application. The QME of the PC/AP STA also instructs the FSE of the PC/AP STA to remove from the scheduling table the VSIDs and the corresponding QoS parameter values associated with the session/application. Further, the QME of the PC/AP STA causes the PC/AP STA to send another VS Update management frame to each non-PC/AP STA participating in the session/application. The VS Update management frame now contains information relating to VSID and a VS Action (i.e., Delete VS) that defines the down-stream, up-stream, or side-stream traffic of the session/application. After a non-PC/AP STA receives the information contained in the VS Update management frame and passes the information to its local QME, the local QME instructs the local FCE of the non-PC/AP STA to remove from the local classification table the entry containing the VSID admitted for the up-stream or side-stream traffic of the session/application. The QME also instructs the FSE (if any) of the non-PC/AP STA to remove from the local scheduling table the entry containing the VSID.

The present invention also allows a non-PC/AP STA to send a VS Update management frame to the PC/AP STA for requesting a setup, modification or termination of a session/application, while keeping admission/policy control and central scheduling at the PC/AP STA. The local QME of the non-PC/AP STA causes the transmission of such a VS Update frame, which does not contain a VSID, or contains a special VSID, in the case of setup request. The PC/AP STA receives the VS Update management frame and passes the information contained therein to the QME of the PC/AP STA. The ACE takes appropriate action based on the information contained in the VS Update management frame, whereas the QME of the PC/AP STA causes the PC/AP STA to send a VS Update management frame back to the non-PC/AP STA. When the request is granted, the return VS Update management frame contains the same information as the VS Update management frame originated by the PC/AP STA as if the request were initiated by the PC/AP STA itself. When the request is rejected, the return VS Update management frame contains the information that the VSID indicated in the original request, in addition to a VS Action (i.e., Reject VS). The ability that a non-STA can initiate such a request is especially useful when end-to-end QoS messages and session/application traffic go to or come from a non-PC/AP STA through a portal or a bridge, but not through the PC/AP STA.

The present invention also provides an in-band QoS signaling reference model that can be incorporated into the architectural reference model of the present invention for enabling a WLAN to support conventional network in-band QoS signaling protocols, such as IETF Diffserv and IEEE 802.1P/Q. Such in-band signaling provides QoS support through layer 3 (as in IETF Diffserv) or layer 2 (as in IEEE 802.1 P/Q) tagging mechanisms. Generally, tagging does not reserve network resources in advance, and is effected through standardized combination patterns of certain bits in a data packet or frame. These combination patterns identify a reduced set of QoS parameters such as flow type and priority level associated with the data traffic.

Figure 2:
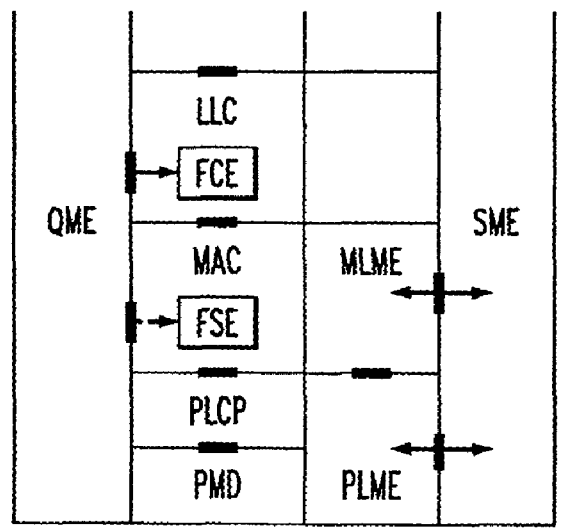
FIG. 2 shows an in-band QoS signaling reference model for QoS support over a WLAN according to the present invention.

FIG. 2 shows an in-band QoS signaling reference model for QoS support over a WLAN according to the present invention. More specifically, FIG. 2 shows a STA that includes a QME, an FCE that is logically located in the LLC sublayer of the STA and an FSE that is logically located in the MAC sublayer of the STA. The FSE may be optional in a non-PC/AP STA. The QME interfaces with the FCE and the FSE, when present.

End-to-end QoS values expected by a new in-band QoS signaling session, together with the corresponding frame classifier, are extracted directly from a data frame of the new session. In particular, when the FCE of a STA finds a data frame—the first data frame—of a new session that cannot be classified using the current classification table, the FCE passes the frame to the QME of the STA.

In the case of a PC/AP-STA, as applicable to down-stream traffic (traffic from a PC/AP STA to a non-PC/AP STA), the QME examines the frame for obtaining the QoS parameter values and classifier characterizing the new down-stream session. The QME also establishes a virtual down-stream (VDS) for transporting the session traffic from the local LLC sublayer entity to one or more peer LLC entities, and assigns a VSID to the newly-established VDS. The QME then passes to the FCE the VSID and the corresponding frame classifier defined for the new down-stream session. The FCE adds the VSID and classifier to its classification table. The QME also passes to the FSE such VSID and the corresponding QoS parameter values. Logically, the FSE maintains the VSID and associated QoS parameter values, plus other information such as data size, in an entry of its scheduling table. Further, the QME of the PC/AP STA causes the PC/AP STA to send a management frame, such as a VS Update management frame, to each non-PC/AP STA participating in the new session in the BSS of the PC/AP STA. The VS Update management contains information, such as VSID, VS Action (i.e., Add VDS), that defines the down-stream session.

In the case of a non-PC/AP-STA, as applicable to up-stream and side-stream traffic (traffic from a non-PC/AP STA to a PC/AP STA or a non-PC/AP STA), the QME examines the frame for obtaining the QoS parameter values and classifier characterizing the new up-stream or side-stream session. The QME of the non-PC/AP STA then causes the non-PC/AP STA to send a management frame, such as a VS Update management frame, to the PC/AP STA of the BSS containing the non-PC/AP STA. The VS Update management frame contains information, such as special VSID, VS Action (i.e., Add VUS or VSS), frame classifier, and QoS parameter values, that defines the up-stream or side-stream session. After the PC/AP STA receives the information contained in the VS Update management frame and passes the information to the QME of the PC/AP STA, the QME establishes a virtual up-stream (VUS) or a virtual side-stream (VSS) for transporting the session traffic between LLC entities, and assigns a VSID to the established VUS or VDS. The QME then passes to the FSE of the PC/AP STA the VSID and the corresponding QoS parameter values. Further, the QME of the PC/AP STA causes the PC/AP STA to return a management frame, such as a VS Update management frame, to the non-PC/AP STA starting the new up-stream or side-stream session in the BSS. The VS Update management contains information, such as assigned VSID, VS Action (i.e., Add VUS or VSS), frame classifier, and QoS parameter values, that defines the up-stream or side-stream session. After the non-PC/AP STA receives the information contained in the VS Update management frame from the PC/AP STA and passes the information to the local QME of the non-PC/AP STA, the QME relays to the local FCE of the non-PC/AP STA the VSID and classifier, and to the local FSE (if present) of the non-PC/AP STA the VSID and QoS parameter values, defined for the up-stream or side-stream session.

The FCE shown in FIG. 2 classifies frames passed down to the LLC sublayer to a VSID using its classification table. The FSE of the PC/AP STA schedules transmission opportunities (TOs) for frames classified to specific VSIDs based on the QoS parameter values associated with the VSIDs. The FSE of a non-PC/AP STA chooses data frames from its active VSs based on the QoS parameter values of those VSs for transmission over the TOs scheduled by the PC/AP STA.

Besides the classification function, the FCE also maintains a timer for each entry of its classification table for detecting termination of a session. When a data frame is classified successfully using a specific entry, the FCE resets the corresponding timer to a predetermined value. When the timer expires before the entry is used for classifying another data frame, the FCE passes that particular entry to the QME of the same STA and then deletes the entry from its classification table. The QME obtains the VSID contained in the entry, and instructs the local FCE of the same STA to remove the VSID together with the corresponding QoS parameter values from the scheduling table. In the case when the timeout event occurs at the PC/AP STA, as applicable to a down-stream session, the QME of the PC/AP STA further causes the PC/AP STA to send a VS Update management frame to each non-PC/AP STA participating in the session in the BSS. The VS Update management frame contains information such as VSID and VS Action (i.e., Delete VDS) that defines the down-stream session. After an addressed non-PC/AP STA receives the information contained in the VS Update management frame and passes the information to its local QME, the local QME causes the non-PC/AP STA to remove any information related to this VDS. In the situation when the timeout event occurs at a non-PC/AP STA, as applicable to an up-stream or side-stream session, the QME of the non-PC/AP STA further causes the non-PC/AP STA to send a VS Update management frame to the PC/AP STA. The VS Update management frame contains information such as VSID and VS Action (i.e., Delete VUS or VSS) that defines the up-stream or side-stream session. After the PC/AP STA receives the information in the VS Update management frame from the non-PC/AP STA and passes the to the QME of the PC/AP STA, the QME instructs the FSE of the PC/AP STA to remove from the scheduling table the entry containing the VSID.

The present invention also provides virtual streams (VSs) over a QoS-driven WLAN that can be set up by the QME of a PC in a BSS of a WLAN for transporting, under defined QoS constraints, the traffic of an admitted session/application from a local LLC entity to one or more peer LLC entities in the same BSS. VSs are torn down by the QME of the PC/AP STA when the underlying session or application is terminated.

Logically, a VS is a unidirectional path between a STA sourcing the VS and one or more other STAs receiving the VS in the BSS. A VS amounts to an identifiable, ordered sequence of data frames for transport within a BSS using a specified set of QoS parameter values. A VS identifier (VSID) is assigned by the QME of a PC/AP STA for identifying the VS upon the setup of the VS. A VSID is local to, and unique within, a given BSS. A VS is defined by a triple of VSID, VS source station address, VS destination station address, and is characterized by a set of QoS parameter values. A VS has no predefined relationship to higher-layer concepts, such as stream, flow, connection or session. A VS exists solely within a BSS, or more precisely, within the MAC sublayer of a WLAN. An appropriate VSID is inserted into each QoS data frame passed down to the LLC sublayer for transmission via a FCE, which is logically located in the LLC sublayer, and removed upon reception at the receiver LLC sublayer before the frame is passed up to the higher layer. Each VSID is associated by the QME of the PC/AP STA with a set of QoS parameter values for the scheduling of frame transmission by an FSE logically located in the MAC sublayer.

Figure 3:
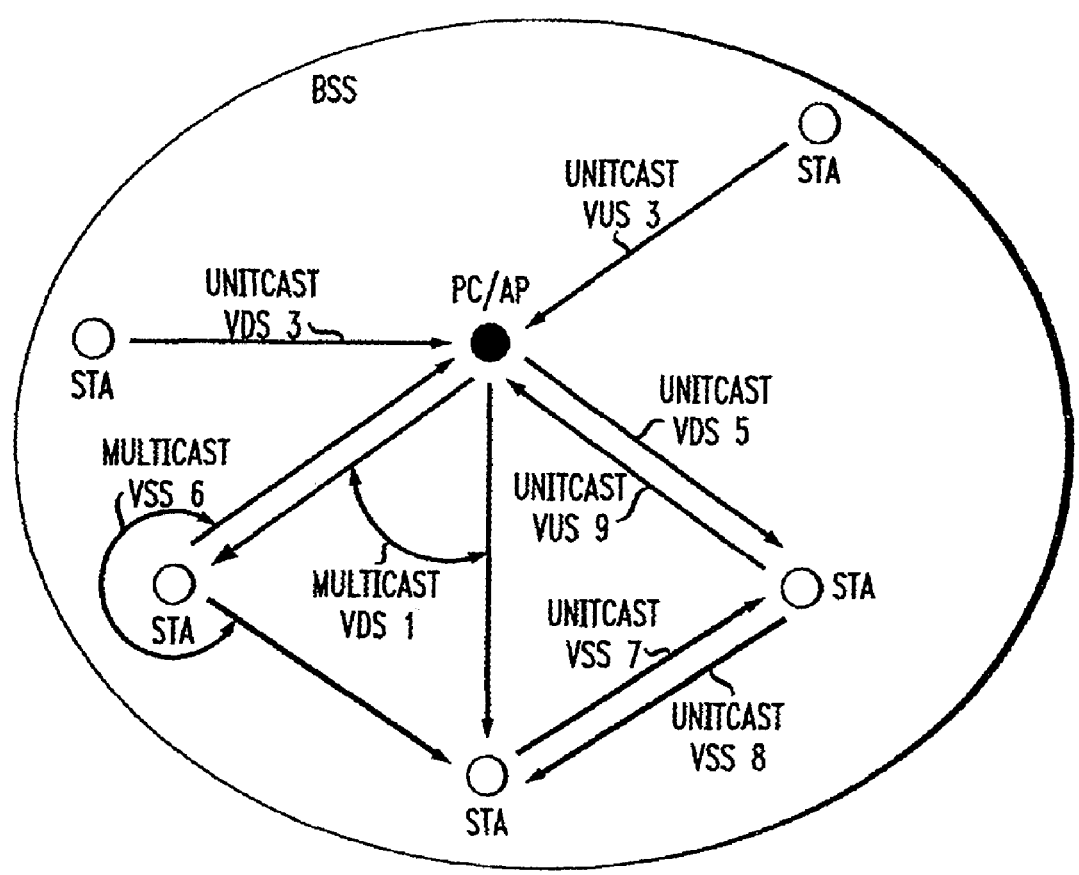
FIG. 3 shows a diagram of virtual streams for QoS support over a WLAN according to the present invention.

FIG. 3 shows a diagram of different types of virtual streams for QoS support over a WLAN according to the present invention. A VS can be a unitcast VS or a multicast VS. A unitcast VS is used for transporting data frames from one STA to another STA within the same BSS, while a multicast VS is used for transporting data frames from one STA to multiple STAs within the same BSS. A VS can further be a virtual down-stream (VDS), a virtual up-stream (VUS), or a virtual side-stream (VSS). A VDS is used for transporting data from the PC/AP STA in a BSS to one or more non-PC/AP STAs in the same BSS. A VUS is used for transporting data from a non-PC/AP STA in a BSS to the PC/AP STA in the same BSS. A VSS is used for transporting data from a non-PC/AP STA in a BSS to at least another non-PC/AP STA in the same BSS.

The QoS parameter values associated with each VSID, that is, the QoS parameter values expected by the session/application traffic to be served by the VS, may be changed in the course of the session/application, as signaled by end-to-end QoS messages and approved by the QME of the PC/AP STA. VSs are allocated bandwidth by the FSE of the PC/AP STA in terms of transmission opportunities (TOs) in accordance with the associated QoS parameter values for transporting data frames classified to the VSs.

A QoS parameter set may be defined by parameters, such as acknowledgment policy, flow type (continuous/periodic or discontinuous/bursty), priority level, privacy information, delay bound, jitter bound, minimum data rate, mean data rate, maximum data burst, with the latter two parameters further relating to the token replenishment rate and bucket size of a token bucket often used in describing or shaping incoming traffic. A STA may support multiple VSs with different sets of QoS values. In response to a TO, a non-PC/AP STA may transmit data from different VSs that the non-PC/AP station sources other than the VS specifically assigned bandwidth, as seen fit by its local FSE based on the QoS values of the active VSs sourced by the STA.

The present invention also provides a technique for implementing admission control over a QoS-driven WLAN that does macro bandwidth management for QoS traffic transport over the MAC sublayer on a session-by-session basis. According to this aspect of the invention, admission control is performed by an ACE that is logically part of a QME of a PC/AP STA. The QME in turn interfaces with an FCE that is logically located in the LLC sublayer of the PC/AP STA and an FSE that is logically located in the MAC sublayer of the PC/AP STA.

Admission control is based on new bandwidth request and current bandwidth availability and accounts for the MAC and PHY overheads. Bandwidth is partitioned into two spaces, one space for sessions/applications of a continuous/periodic flow type and the space for sessions/applications of a discontinuous/bursty flow. In general, the continuous/periodic flow type is time sensitive and requires real-time service, while the discontinuous/bursty flow type is time tolerant and has a relatively lower priority. The FSE of the PC/AP STA of a given BSS provides feedback for every superframe through a channel status service primitive to the ACE, similar to a DSBM used with the RSVP QoS protocol, providing information with respect to the current contention-free period (CFP), such as the useable bandwidth and the used bandwidth, respectively, for both the continuous and discontinuous flow types of traffic.

When a new bandwidth request is received for a session/application of a continuous flow type, the request will be granted only when there is adequate bandwidth still unused so that admission of the new session/application will meet its QoS requirement and while not degrading the performance of already admitted sessions/applications. When the unused bandwidth is not sufficient for supporting the new session/application, but adequate bandwidth that is being used for the discontinuous flow type can be preempted for serving the new session/application, then the new request can also be granted with the consequence of degrading some or all existing sessions/applications of a discontinuous flow type. When a new bandwidth request is received for a session/application of a discontinuous flow type, the request will be granted provided that the sum of the unused bandwidth plus the used bandwidth for a discontinuous flow type having a lower priority level than the priority level of the new session/application is sufficient for honoring the new request.

In any case, bandwidth reservation may be based on the bursty characteristics of the traffic concerned, as quantified by the token rate and bucket size of the token bucket mechanism, or on the mean data rates using only the taken rate of the token bucket. For example, suppose that the effective channel rate (accounting for the MAC and PHY overheads) is C; that the time duration of each superframe, which comprises of a CFP and a contention period (CP) as defined by IEEE P802.11/1999, is T; that the mean data rate of a session is represented by the token rate R; and the maximum data burst of a session is given by the bucket size B. The bandwidth requirement in terms of the channel time per CFP for such a session will be $(R*T+B)/C$ for traffic burstiness based admission, and $R*T/C$ for mean rate based admission, assuming appropriate units for C, T, R and B.

Figure 4:
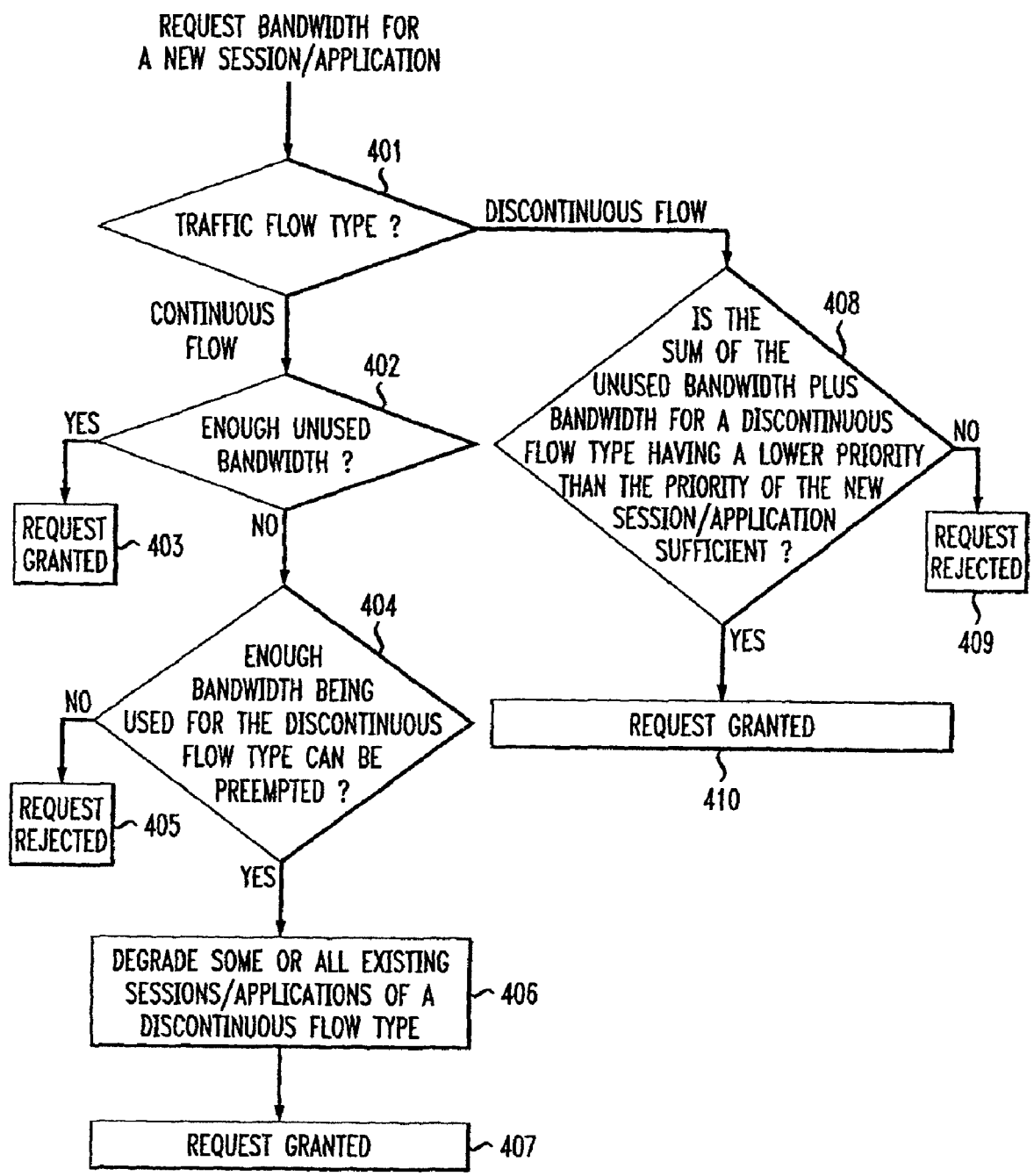
FIG. 4 shows a flow diagram for an admission control technique that can be used for QoS support in a WLAN according to the present invention.

FIG. 4 shows a flow diagram 400 for an admission control technique that can be used for QoS support in a WLAN according to the present invention. At step 401, the type of traffic flow is determined in response to a request for bandwidth for a new session/application. If, at step 401, the traffic type is a continuous flow traffic type, flow continues to step 402 where it is determined whether there is sufficient unused bandwidth available for allocating to the requesting session/application. If, at step 402, there is sufficient unused bandwidth, flow continues to step 403 where the request is granted.

If, at step 402, there is not sufficient unused bandwidth available for allocating to the requesting session/application, flow continues to step 404 where it is determined whether there is sufficient bandwidth being used by existing discontinuous flow type sessions/applications that can be preempted. If, at step 404, there is insufficient bandwidth that can be preempted from existing discontinuous flow type sessions/applications, flow continues to step 405 where the request is rejected. If, at step 404, there is sufficient bandwidth that can be preempted from discontinuous flow type sessions/applications, flow continues to step 406 where some or all of the existing sessions/applications of a discontinuous flow type are degraded. Flow continues to step 407 where the request is granted.

If, at step 401, the requesting session/application is of a discontinuous traffic flow type, process flow continues to step 408 where it is determined whether the sum of the unused bandwidth plus the bandwidth for a discontinuous flow type having a lower priority than the priority of the requesting session/application is sufficient. If, at step 408, there is not sufficient bandwidth for the requesting session/application, flow continues to step 409 where the request is rejected. If, at step 408, there is sufficient bandwidth for the requesting session/application, flow continues to step 410 where the request is granted.

The present invention also provides a technique for implementing frame classification over a QoS-driven WLAN that enables the QoS information to pass from higher layers (above link layer) to lower layers (LLC and MAC sublayers) once per session or per session change. According to this aspect of the present invention, frame classification is performed by a frame classification entity (FCE) that is logically located in the LLC sublayer of a station. After a frame has been classified, frame scheduling of the classified frame is performed by a frame scheduling entity (FSE) that is logically located in the MAC sublayer. Both the FCE and the FSE are interfaced to a QoS management entity (QME) that contains an ACE or a QoS signaling entity (QSE).

Frame classification finds appropriate virtual stream identifiers (VSIDs) to label frames passed down to the LLC sublayer by examining frames against classifiers in a classification table. The VSIDs are linked by the QME to specific sets of QoS parameter values for use by the FSE to schedule the transfer of frames between LLC entities. Via a QME or a VS UPDATE management frame, VSIDs are established to correspond with classifiers and sets of QoS parameter values for an admitted session/application. Prior to the start of the session/application, paired VSIDs and classifiers are provided to the classification table of the FCE, while paired VSIDs and sets of QoS parameter values are provided to the scheduling table of the FSE.

Classifier entries are placed in the classification table in the order of descending search priority values. A classifier entry in the classification table is comprised of a VSID, a search priority, and classifier parameters. The classifier parameters may be IP classifier parameters, LLC classifier parameters, or IEEE 802.1 P/Q parameters. The IP classifier parameters are parameters such as IP TOS Range/Mask, IP Protocol, IP Source Address/Mask, IP Destination Address/Mask, TCP/UDP Source Port Start, TCP/UDP Source Port End, TCP/UDP Destination Port Start, and TCP/UCP Destination Port End. The LLC classifier parameters are parameters such as Source MAC Address, Destination MAC Address, and Ethertype/SAP. The IEEE 802.1P/Q parameters are such parameters as 802.1P Priority Range and 802.1Q VLAN ID. When a frame is classified successfully in the order of descending search priorities using one or more of the classifier parameters contained in an entry, the VSID value contained in the first matched entry provides the VSID to designate the QoS parameter set for the resulting MAC service primitive used for passing the classified frame to the MAC sublayer, or otherwise the frame is indicated as a best-effort (asynchronous) frame.

Figure 5:
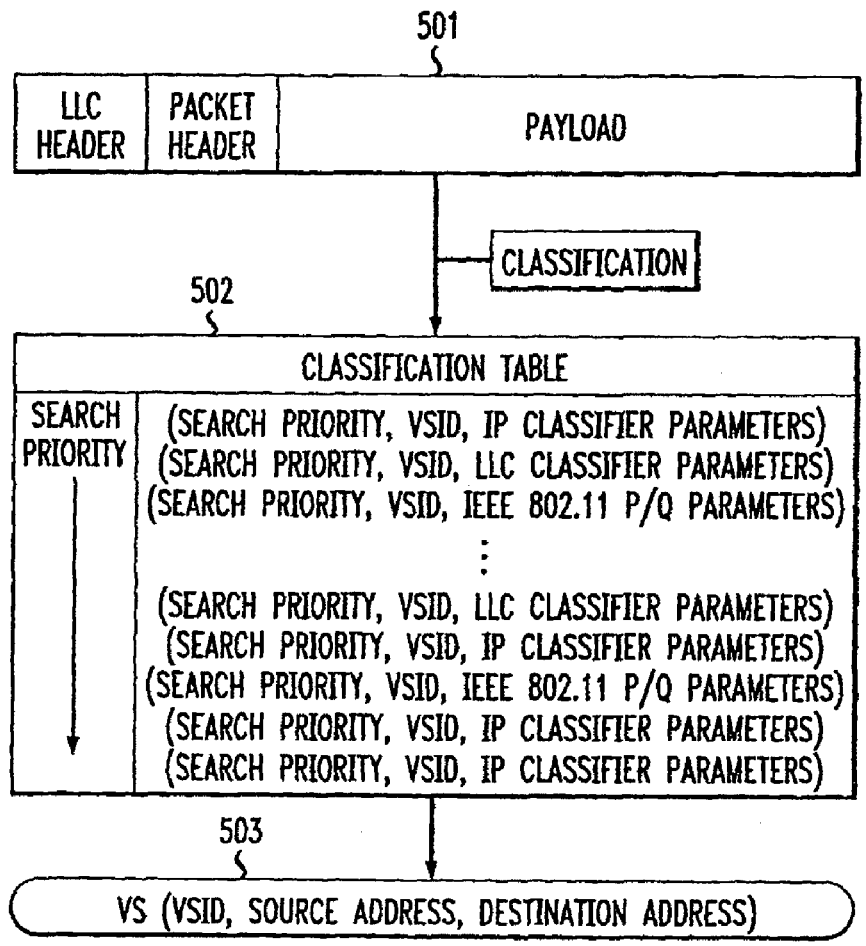
FIG. 5 depicts a process for classifying a frame that can be used in a QoS-driven WLAN according to the present invention.

FIG. 5 depicts a process for classifying a frame that can be used in a QoS-driven WLAN according to the present invention. A frame 501 that has been passed down to the LLC sublayer of a station from a higher layer in the station is received by the QME of the station. The QME examines the frame for information included in the received frame that is included in at least one of the classifier parameters in at least one of the classifier entries in a classification table 502. The QME examines the entries in the classification table in the order of descending search priorities when classifying the received frame. The VSID value contained in the first matched entry is used for identifying the VS 503 and the corresponding QoS parameter set for transporting the data frame between peer LLC entities of the BSS.

The present invention also provides a technique for implementing frame scheduling over a QoS-driven WLAN that does micro bandwidth management for QoS traffic transport over the MAC sublayer in all directions of a given basic service set (BSS) on a superframe-by-superframe basis. According to this aspect of the invention, frame scheduling is performed by a frame scheduling entity (FSE) that is logically located in the MAC sublayer of a PC/AP, which can be possibly assisted by a FSE of a non-PC station, in the BSS. Frame scheduling is based on the classification results, as expressed in a virtual stream identifier (VSID) for a QoS frame or in a best-effort priority value for a non-QoS frame, of an FCE that is logically located in the LLC sublayer of the PC/AP or a station associated with the PC. Frame scheduling is thus guided by the QoS parameter values associated by the QME of the PC/AP with each classified VSID, the QoS parameter values being null for a best-effort priority value.

Figure 6:
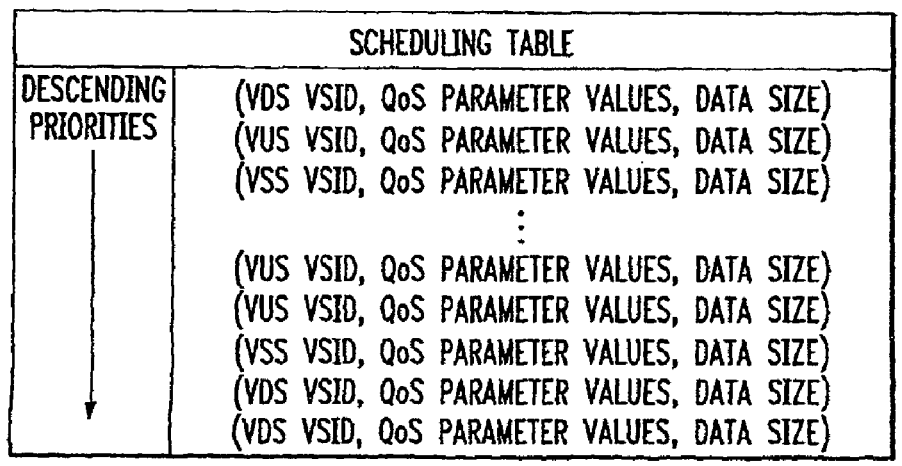
FIG. 6 shows an exemplary scheduling table that can be used for frame scheduling over a QoS-driven WLAN according to the present invention.

Frame scheduling schedules transfer during the contention-free period (CFP), between peer LLC entities, of frames passed down to the MAC sublayer of all the stations, including that the LLC entity within a PC/AP, in the BSS. A virtual central queue or scheduling table is formed at the PC/AP so that a QoS queuing or scheduling algorithm can be adapted for scheduling the service (i.e., transfer) of the frames queued in actuality or by prediction at the PC/AP or non-PC stations associated with the PC/AP. FIG. 6 shows an exemplary scheduling table that can be used for frame scheduling over a QoS-driven WLAN according to the present invention. The table includes entries for queuing the traffic of admitted down-stream sessions (i.e., traffic to be transmitted from the PC/AP) and the traffic of admitted up-stream and side-stream sessions (i.e., traffic to be transmitted from non-PC stations) in the BSS.

An entry for the PC/AP is always present for the transfer of the traffic from the PC/AP to non-PC stations associated with the PC/AP. An entry for each non-PC station in the BSS is automatically created when the non-PC station is associated with the PC/AP for serving the best-effort traffic from that station. An entry is also created for each VS when the VS is set up by the QME of the PC/AP for transporting the traffic of a newly-admitted session. When a VS is torn down by the QME because the session is terminated, the entry corresponding to the torn-down VS is removed from the frame scheduling table. For QoS traffic, each entry includes the VSID and QoS parameter values supporting the session, as well as a size for the data on the corresponding VS. QoS entries in the table may be ordered in descending priority levels associated with the VSIDs corresponding to the entries.

For a virtual down-stream (VDS) (or for the PC/AP), the size value of an entry is updated when the size on the VDS (or for the best-effort down-stream traffic from the PC) waiting for transmission is changed. For a virtual up-stream (VUS) or a virtual side-stream (VSS) of continuous/periodic flow type, as indicated in the corresponding QoS parameter set, the size value of the entry is derived from the appropriate QoS values for the VUS or VSS, such as mean data rate and maximum data burst as defined by the token bucket mechanism. The size value of an entry may be changed to reflect the real size as piggybacked by the transmitting station in a frame. For a VUS or a VSS of discontinuous/bursty flow type (or for the best-effort traffic of a non-PC station), the size value of the entry is provided and updated by the sending station through either a reservation request or a piggybacking. For traffic policing or for congestion control, the maximum data size transmitted from a VS over a certain time interval, such as a superframe time, T may be restricted by the token bucket mechanism to R*T+B, assuming appropriate units for R, T and B, where R and B are the token rate and bucket size of the token bucket.

With a central scheduling table, the FSE of the PC/AP can schedule transmission opportunities (TOs) in the CFP for queued traffic based on the data size in each entry and based on other QoS parameter values stored in each entry, such as priority level, delay bound, and jitter bound. A TO is defined by a nominal start time and a maximum duration time. A non-PC station may also form a local scheduling table pertaining to traffic that is to be transmitted from the station, so that the local FSE of the non-PC station can choose data from appropriate VUSs or VSSs under it for transmission in response to a given TO. When allocating TOs for queued traffic, the FSE of the PC/AP will also consider e allocation of centralized contention opportunities (CCOs) used in centralized contention by non-PC stations in the BSS for sending a reservation request when a new burst of frames arrives in an empty buffer at the station. Such consideration is based on a centralized contention algorithm.

Figure 7:
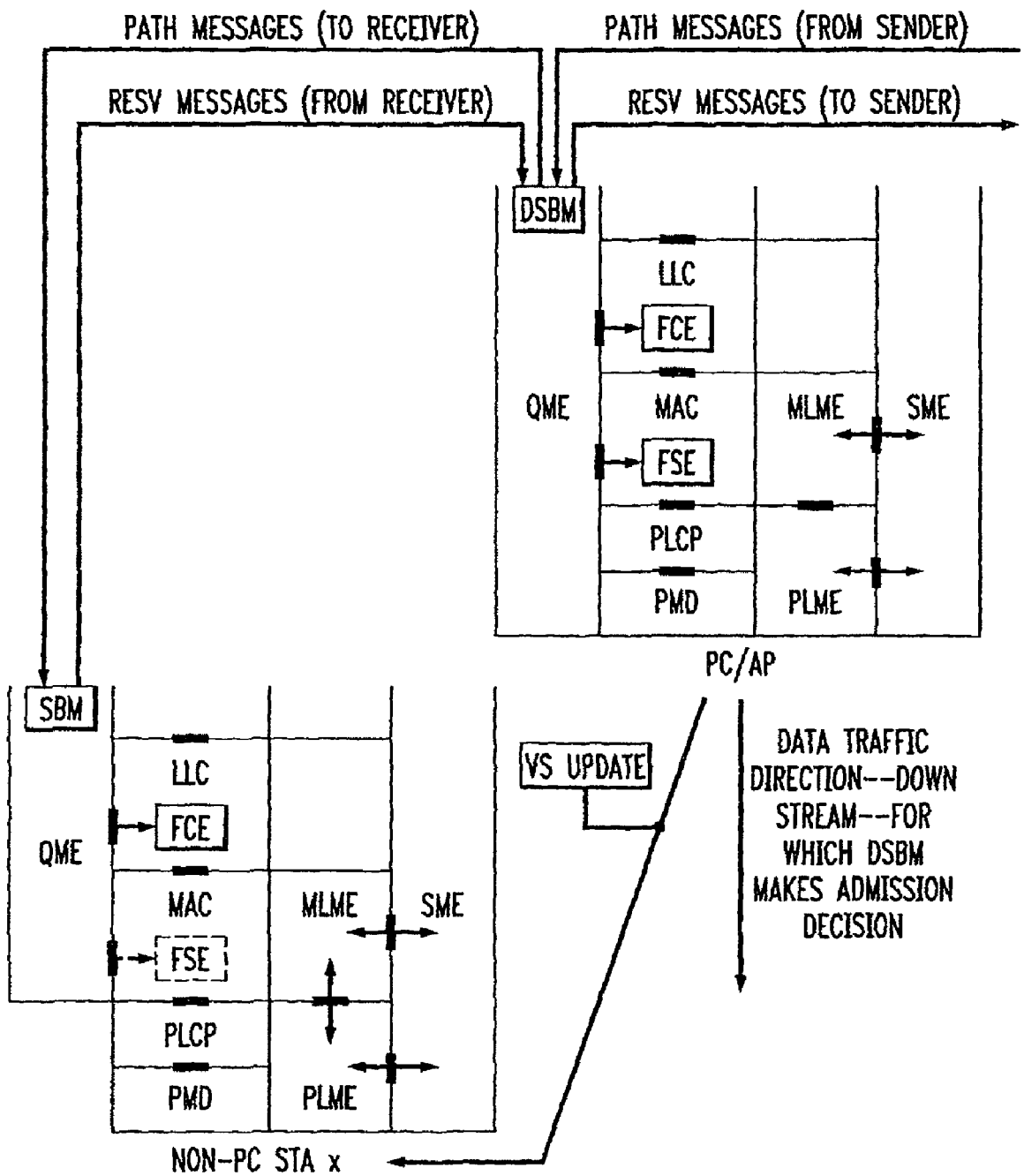
FIG. 7 shows a signal path diagram for RSVP/SBM-based down-stream session setup, modification, and teardown over a QoS-driven WLAN according to the present invention.

The present invention also provides RSVP/SBM-based down-stream session setup, modification and teardown over a QoS-driven WLAN and the corresponding service interfaces. A down-stream session is defined herein to be a data flow, supported by a particular transport-layer protocol, originating from a user outside a given BSS of a wireless LAN, passed through a PC/AP of the BSS, and destined to one or more stations within the BSS. FIG. 7 shows a signal path diagram for RSVP/SBM-based down-stream session setup, modification, and teardown over a QoS-driven WLAN according to the present invention.

A user outside a BSS initiates a down-stream session by having its RSVP agent send out Path messages of the RSVP signaling protocol. The Path messages are propagated to a designated subnet bandwidth manager (DSBM) located in the PC/AP of the BSS. The DSBM in turn sends Path messages to the subnet bandwidth manager (SBM) of each station to receive the session inside the BSS. After the SBM of a destination station receives the messages, the SBM of the destination station begins resource reservation by sending Resv messages of the RSVP signaling protocol back to the DSBM. The DSBM then performs admission control with respect to the down-stream traffic transfer in the BSS of the down-stream session. The DSBM further sends appropriate Resv messages back to the session sender based on the outcome of its admission decision. Path messages and Resv messages for a given session are sent periodically by the session sender and receiver(s), and may be changed in the course of a session. The DSBM also responds to the change by sending out appropriate Resv messages. Path messages and Resv messages are transparent to the LLC and MAC sublayers.

In particular, when the DSBM detects new Path/Resv messages of the RSVP signaling protocol for a down-stream session to be set up, the DSBM extracts the QoS parameter values and the classifier from the messages. The DSBM then makes an admission decision on the session based on such factors as policy control and resource control, with resource availability information being provided periodically by the FSE of the PC/AP, which is logically of the MAC sublayer. When the session fails to pass the admission control, the DSBM rejects the session. When the session is admitted, the QME of the PC/AP sets up a new virtual down-stream (VDS) for transporting the down-stream session traffic. That is, the QME establishes a VSID for the VDS. The QME then instructs the FCE to create an entry for the VSID and classifier defining the session in the classification table of the FCE. The QME also instructs the FSE to create an entry for the VSID and QoS parameter values defining the session in the scheduling table of the FSE. Further, the QME instructs the MAC sublayer management entity (MLME) to issue a management frame, VS Update, for transmission to each of the stations to receive the session in the same BSS. The VS Update frame in this situation contains information such as VSID and VS Action (Add VDS) for the down-stream session.

When the DSBM detects a change of an admitted down-stream session from the Path/Resv messages of the RSVP signaling protocol for the session, the DSBM extracts the new QoS values defining the session from the messages, and decides whether to honor the modified QoS request. When the modification cannot be accepted, the session remains active under the previous QoS values. When the modification is accepted, the QME of the PC/AP modifies the VDS serving the session to reflect the changed QoS values associated with the VDS. That is, the QME instructs the FSE to update the scheduling table with the new QoS values for the entry created for the session as identified by the established VSID.

When the DSBM detects a termination of an admitted down-stream session from either the Path/Resv messages of the RSVP protocol or a timeout indication for the session, the QME of the PC/AP tears down the VDS established for the session/application. That is, the QME matches the classifier defining the session/application to the VSID for the VDS. The QME then instructs the FCE to delete the entry for the VSID and classifier defining the session/application from the classification table. The QME also instructs the FSE to delete the entry of the VSID and QoS values defining the session/application from the scheduling table. Further, the QME instructs the MLME to send another VS Update frame to each station receiving the session/application in the same BSS. The VS Update contains information such as VSID and VS Action (i.e., Delete VDS) for the session.

Figure 8:
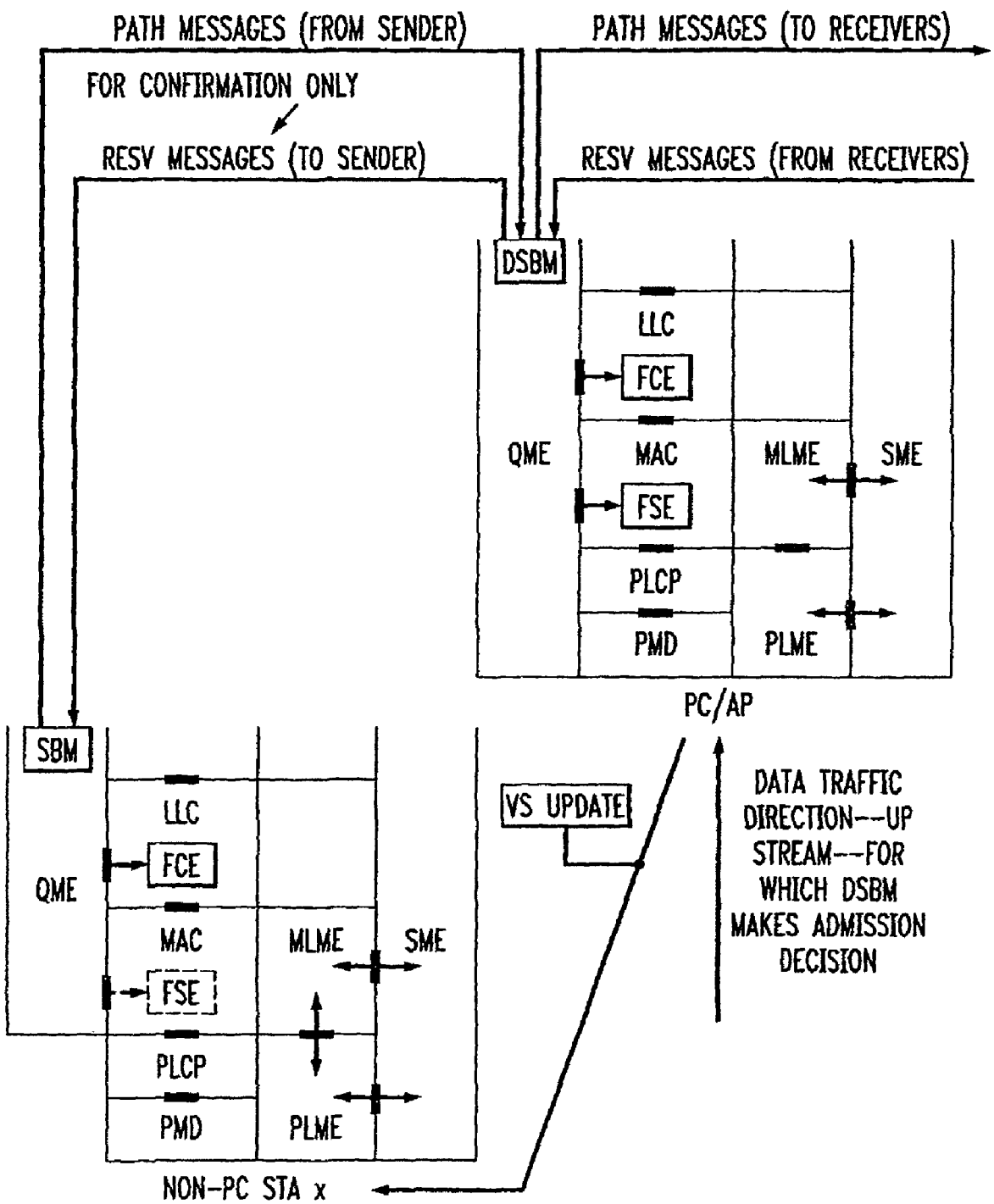
FIG. 8 shows a signal path diagram for an RSVP/SBM-based up-stream session setup, modification, and teardown over a QoS-driven WLAN according to the present invention.

The present invention also provides an RSVP/SBM-based up-stream session setup, modification and teardown over a QoS-driven WLAN and the corresponding service interfaces. An up-stream session is defined herein to be a data flow, supported by a particular transport-layer protocol, that originates from a station inside a given BSS of a wireless LAN, passed through a PC/AP of the BSS, and destined to one or more users outside the BSS. FIG. 8 shows a signal path diagram for an RSVP/SBM-based up-stream session setup, modification, and teardown over a QoS-driven WLAN according to the present invention.

A station inside a given BSS initiates an up-stream session by having its SBM send out Path messages of the RSVP signaling protocol. The Path messages are sent to the DSBM located in the PC/AP of the BSS. The DSBM in turn sends the Path messages to the RSVP agent of each user that is to receive the session outside the BSS. After a destination RSVP agent receives the messages, the destination RSVP agent begins resource reservation by sending Resv messages of the RSVP signaling protocol back to the DSBM. The DSBM then performs an admission control operation with respect to the up-stream traffic transfer in the BSS of the up-stream session on behalf of the SBM of the session sender. The DSBM further sends appropriate Resv messages back to the session sender based on the outcome of the admission decision. The Resv messages sent back to the session sender are for confirmation only, and do not require the recipient, i.e., the SBM of the sending station, to perform resource reservation for the up-stream traffic of the station, as would be the case with the conventional RSVP signaling protocol. Path messages and Resv messages for a given session are sent periodically by the session sender and receiver(s), and may be changed in the course of a session. The DSBM also responds to a change by sending out appropriate Resv messages, to which the recipient (again the SBM of the sending station) will not take any resource reservation action in response. Path messages and Resv messages are transparent to the LLC and MAC sublayers.

In particular, when the DSBM detects new Path/Resv messages of the RSVP signaling protocol for an up-stream session to be set up, the DSBM extracts the QoS parameter values and the classifier from the messages, and makes an admission decision on the session based on factors such as policy control and resource control, with resource availability information being provided periodically by the FSE that is logically located in the MAC sublayer of the PC/AP. When the session fails to pass the admission control, the DSBM rejects the session. When the session is admitted, the QME of the PC/AP sets up a new virtual up-stream (VUS) for transporting the up-stream session traffic. That is, the QME establishes a virtual stream identifier (VSID) for the VUS. The QME then instructs the FSE of the PC/AP to create an entry for the VSID and QoS parameter values defining the session in the scheduling table of the FSE. Further, the QME instructs the MLME (MAC sublayer management entity) of the PC/AP to issue a management frame, VS Update, for transmission to the station initiating the session. The VS Update frame in this case contains information such as VSID, frame classifier, VS Action (i.e., Add VUS), and QoS parameter values for the up-stream session. Once the addressed station receives the VS Update frame, its local QME instructs the local FCE to create an entry for the VSID and frame classifier defining the session in the local classification table. The local QME also instructs the local FSE to create an entry for the VSID and QoS parameter values defining the session in the local scheduling table.

When the DSBM detects a change of an admitted up-stream session from the Path/Resv messages of the RSVP signaling protocol for the session, the DSBM extracts the new QoS parameter values defining the session from the messages, and determines whether to honor the modified QoS request. When the modification cannot be accepted, the session will remain active under the previous QoS parameter values. When the modification is accepted, the QME of the PC/AP modifies the VUS serving the session to reflect the changed QoS parameter values associated with the VUS. That is, the QME of the PC/AP instructs the FSE of the PC/AP to update the scheduling table with the new QoS parameter values for the entry created for the session, as identified by the established VSID. The QME further instructs the MLME of the PC/AP to issue another VS Update frame to the station initiating the session. The VS Update frame in this situation contains information such as VSID, VS Action (i.e., Modify VUS), and new QoS parameter values for the session. Once the station initiating the session receives the VS Update frame, its local QME instructs the local FSE to update the entry of the VSID defining the session in the local scheduling table with the new QoS parameter values.

When the DSBM detects a termination of an admitted up-stream session from either the Path/Resv messages of the RSVP protocol or a timeout indication for the session, the QME of the PC/AP tears down the VUS established for the session. That is, the QME of the PC/AP matches the classifier defining the session to the VSID for the VUS. The QME of the PC/AP then instructs the FSE of the PC/AP to delete the entry of the VSID and QoS parameter values defining the session from the scheduling table. Further, the QME instructs the MLME of the PC/AP to send another VS Update frame to the station initiating the session. This particular VS Update contains information such as VSID and VS Action (i.e., Delete VUS) for the session. Once the station initiating the session receives the VS Update frame, its local QME instructs the local FCE to delete the entry of the VSID and classifier defining the session from the local classification table. The QME also instructs the local FSE to delete the entry of the VSID and QoS parameter values defining the session from the local scheduling table.

Figure 9:
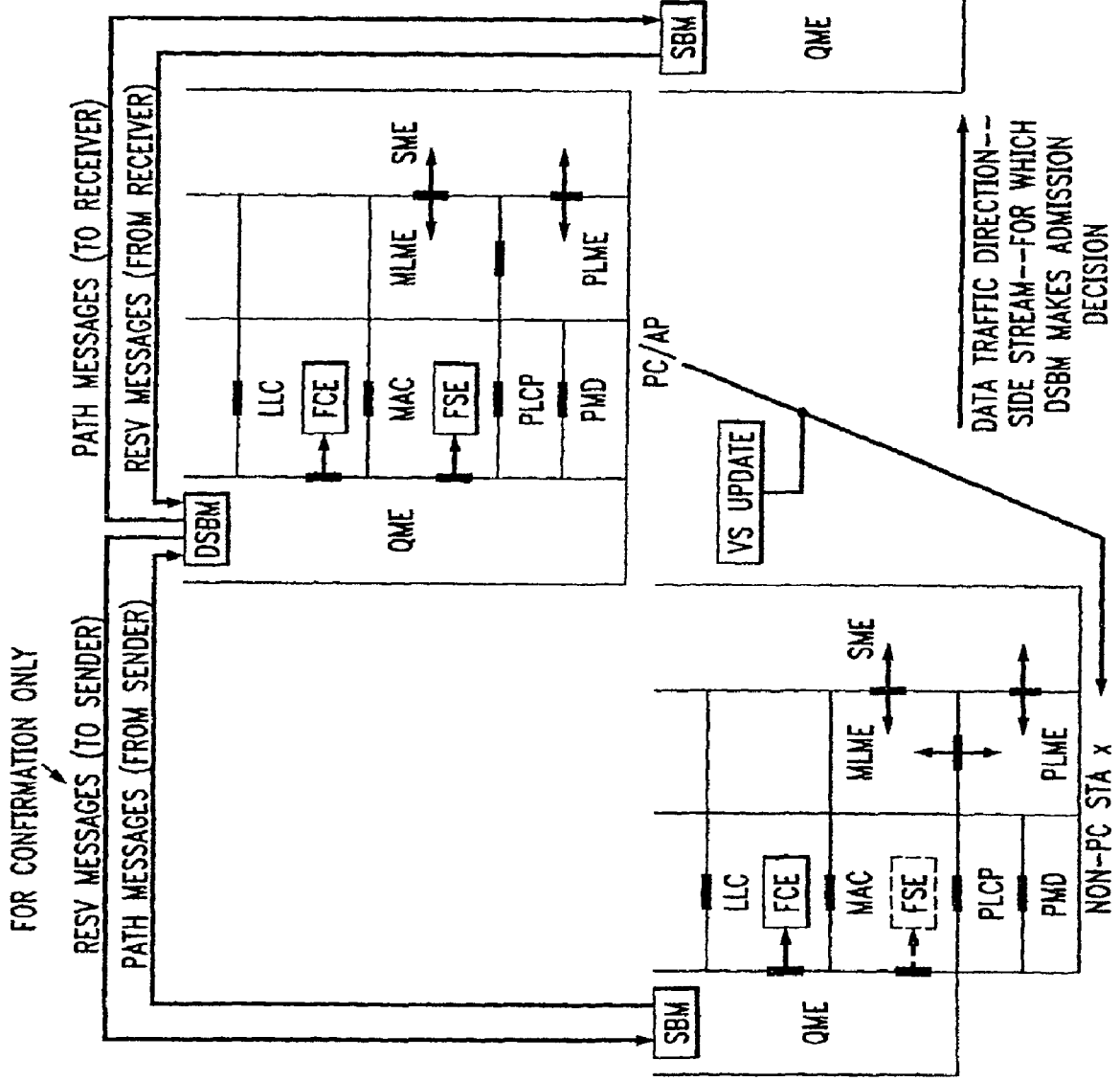
FIG. 9 shows a signal path diagram for RSVP/SBM-based side-stream session setup, modification and teardown over a QoS-driven WLAN according to the present invention.

The present invention also provides RSVP/SBM-based side-stream session setup, modification and teardown over a QoS-driven WLAN and the corresponding service interfaces. A side-stream session is defined herein to be a data flow, supported by a particular transport-layer protocol, that originates from a station inside a given BSS of a wireless LAN and destined directly to one or more stations within the BSS. The data flow may also be destined to any user outside the BSS through a PC/AP of the BSS. FIG. 9 shows a signal path diagram for RSVP/SBM-based side-stream session setup, modification, and teardown over a QoS-driven WLAN according to the present invention.

A station inside a given BSS initiates a side-stream session by having its SBM send out Path messages of the RSVP signaling protocol. The Path messages are sent to the DSBM located in the PC/AP of the BSS. The DSBM in turn sends Path messages to the RSVP agent of each user intended to receive the session outside the BSS, and to the SBM of each station intended to receive the session inside the BSS. After a destination RSVP agent receives the messages, the destination RSVP agent begins resource reservation by sending Resv messages of the RSVP signaling protocol back to the DSBM of the PC/AP. The SBM of each destination station within the BSS also begins resource reservation by sending its own Resv messages back to the DSBM of the PC/AP. The DSBM of the PC/AP then performs an admission control operation with respect to the side-stream traffic transfer in the BSS of the side-stream session on behalf of the SBM of the session sender. The DSBM further sends appropriate Resv messages back to the session sender based on the outcome of the admission decision. The Resv messages are for confirmation only, and do not require the recipient, i.e., the SBM of the sending station, to perform resource reservation for the side-stream traffic of the station, as would be the case with the conventional RSVP signaling protocol. Path messages and Resv messages for a given session are sent periodically by the session sender and receiver(s), and may be changed in the course of a session. The DSBM of the PC/AP also responds to the change by sending out appropriate Resv messages, to which the recipient (again, the SBM of the sending station) will not take any resource reservation action in response. Path messages and Resv messages are transparent to the LLC and MAC sublayers.

In particular, when the DSBM detects new Path/Resv messages of the RSVP signaling protocol for a side-stream session to be set up, the DSBM extracts the QoS parameter values and the classifier from the messages, and makes an admission decision on the session based on factors such as policy control and resource control, with resource availability information being provided periodically by the FSE of the MAC sublayer in the PC/AP. When the session fails to pass the admission control, the DSBM rejects the session. When the session is admitted, the QME of the PC/AP sets up a new virtual side-stream (VSS) for transporting the side-stream session traffic. That is, the QME of the PC/AP establishes a virtual stream identifier (VSID) for the VSS. The QME then instructs the FSE of the PC/AP, which is logically part of the MAC sublayer, to create an entry for the VSID and QoS parameter values defining the session in the scheduling table of the FSE. Further, the QME instructs the MLME of the PC/AP to issue a management frame, VS Update, for transmission to the station initiating the session. The VS Update frame in this situation contains information such as VSID, frame classifier, VS Action (i.e., Add VSS), and QoS parameter values for the side-stream session. Once the station initiating the session receives the frame, its local QME instructs the local FCE to create an entry for the VSID and frame classifier defining the session in the local classification table. The local QME also instructs the local FSE to create an entry for the VSID and QoS parameter values defining the session in the local scheduling table. Additionally, the QME of the PC/AP instructs the MLME of the PC/AP to issue a management frame, VS Update, for transmission to each station intended to receive the session in the same BSS. The VS Update frame in this situation contains information such as VSID and VS Action (i.e., Add VSS) for the side-stream session.

When the DSBM detects a change of an admitted side-stream session from the Path/Resv messages of the RSVP signaling protocol for the session, the DSBM extracts the new QoS parameter values defining the session from the messages, and determines whether to honor the modified QoS request. When the modification cannot be accepted, the session will remain active under the previous QoS parameter values. When the modification is accepted, the QME of the PC/AP modifies the VSS serving the session to reflect the changed QoS parameter values associated with the VSS. That is, the QME of the PC/AP instructs the FSE of the PC/AP to update the scheduling table with the new QoS values for the entry created for the session, as identified by the established VSID. The QME of the PC/AP further instructs the MLME of the PC/AP to issue another VS Update frame to the station initiating the session. The VS Update frame in this situation contains information such as VSID, VS Action (i.e., Modify VSS), and new QoS parameter values for the session. Once the addressed station receives the frame, its local QME instructs the local FSE to update the entry of the VSID defining the session in the local scheduling table with the new QoS parameter values.

When the DSBM detects a termination of an admitted side-stream session from either the Path/Resv messages of the RSVP protocol or a timeout indication for the session, the QME of the PC/AP tears down the VSS established for the session. That is, the QME of the PC/AP matches the classifier defining the session to the VSID for the VSS. The QME of the PC/AP then instructs the FSE of the PC/AP to delete the entry of the VSID and QoS parameter values defining the session from the scheduling table. Further, the QME instructs the MLME of the PC/AP to send another VS Update frame to the station initiating the session. In this situation, the VS Update frame contains information such as VSID and VS Action (i.e., Delete VSS) for the session. Once the addressed station receives the VS Update frame, its local QME instructs the local FCE to delete the entry of the VSID and classifier defining the session from the local classification table. The local QME also instructs the local FSE to delete the entry of the VSID and QoS parameter values defining the session from the local scheduling table. Additionally, the QME of the PC/AP instructs the MLME of the PC/AP to send another VS Update frame to each station receiving the session in the same BSS. The VS Update frame contains information such as VSID and VS Action (i.e., Delete VSS) for the session.

The present invention also provides enhanced channel access mechanisms over a QoS-driven WLAN that greatly improve QoS capability and channel utilization on a wireless LAN over simple polling and distributed contention schemes as defined by IEEE P802.11/1999. Channel access according to the present invention is driven by QoS parameter values that are associated with admitted sessions/applications. Specifically, down-stream traffic (from a PC/AP STA to at least one non-PC/AP STA) is given TOs directly by the FSE of the PC/AP STA in a given BSS of a WLAN based on the corresponding set of QoS parameter values, such as delay bound and mean data rate for the down-stream traffic. Up-stream and side-stream traffic (from a non-PC/AP STA to the PC/AP STA or a non-PC/AP STA) of a continuous/periodic flow type is allocated TOs periodically by the FSE of the PC/AP STA also in accordance with the corresponding set of QoS parameter values for the up-stream and side-stream traffic. Up-stream and side-stream traffic of a discontinuous/bursty flow type is allocated TOs only when there is data buffered at non-PC/AP stations for transmission, with the allocation further being subject to the QoS parameter values. Consequently, channel bandwidth is not idled away due to inactive stations, as would be the case when all the stations associated with the PC/AP STA were polled for data transmission, regardless of the respective flow type of their traffic. QoS based channel access according to the present invention also allows higher priority traffic to be transferred, an important mechanism, especially in the case of inadequate bandwidth.

The channel access mechanisms of the present invention include a centralized contention and reservation request scheme that is carried out under the control of a point coordination function (PCF) contained in the PC/AP STA, in addition to a conventional distributed contention scheme that is under the control of a conventional distributed coordination function (DCF) contained equally in every STA, as described in IEEE P802.11/1999. The channel access mechanisms of the present invention further include a multipoll scheme that announces multiple TOs in a single frame under the PCF, in contrast to the simple poll scheme that announces one TO in one frame, as provided by IEEE P802.11/1999.

According to this aspect of the invention, non-PC/AP stations use centralized contention for sending a reservation request (RR) to the PC for channel bandwidth allocation when a non-PC/AP stations have a new burst of data frames to transmit (to the PC/AP STA or/and other stations). In each "contention-free period" (CFP) under the PCF, zero, one or multiple centralized contention intervals (CCIs) may be selected by the PC for centralized contention. The length of each CCI is expressed in units of centralized contention opportunities (CCOs), and is also determined by the PC. The number of available CCIs and the length of each CCI are announced by the PC/AP STA in a contention control (CC) frame. A station, if permitted to send an RR, sends an RR into any one of the available CCOs following a CC frame. Stations that successfully sent an RR frame in a given CCI will be identified in the next CC frame sent by the PC/AP STA. Such positive indication may also be effected in the form of a TO given to the transmission of the data burst for which an RR was sent. Stations that did not successfully send an RR frame in a given CCI may retry in the next CCI.

The phrase "contention-free period" loosely corresponds to a conventional "contention period" (CP), as defined in IEEE P802.11/1999. In contrast to the present invention, CP refers to distributed contention as operating under the DCF of IEEE P802.11/1999, whereas CFP of the present invention implies no such contention, but can have centralized contention under the PCF. Centralized contention enables a PC, or an FSE inside the PC/AP STA, to have complete control of channel bandwidth such that the period seized by non-PC/AP STAs for contention is determined by the PC in advance, as opposed to distributed contention by which STAs can seize the channel for an unpredictable duration and thereby may lock up channel access for other contending sessions/applications. The centralized contention of the present invention also allows the PC to optimize the bandwidth allocation for such contention so that channel throughput is increased while access delay is reduced, compared to distributed contention. This is because the PC can maintain a global history of the contention outcome of all the stations, and thus can optimally estimate the bandwidth need for centralized contention and conflict resolution for previous contention, whereas a station using distributed contention contends based on the local knowledge of its own contention history and thus cannot optimize the overall contention algorithm. Moreover, with centralized contention, stations send only RRs of very short length and only once for a new burst, while with distributed contention stations send data frames of much larger length and may have to contend several times for each data burst because a data burst generally needs to be decomposed into a number of data frames that do not exceed a predefined size. Therefore, the present invention yields much less contention intensity and, hence, much higher channel throughput and lower access delay, than a conventional distributed contention technique.

A multipoll is sent by the PC/AP STA for conveying a sequence of TOs to one or more non-PC/AP stations for up-stream and/or side-stream transmission. A multipoll also specifies the length of each TO. This technique of the present invention is particularly useful when direct station-to-station communication is involved, thereby avoiding the situation that data frames need to be sent to the PC/AP STA first and then back to the destination non-PC/AP STA(s).

Figure 10:
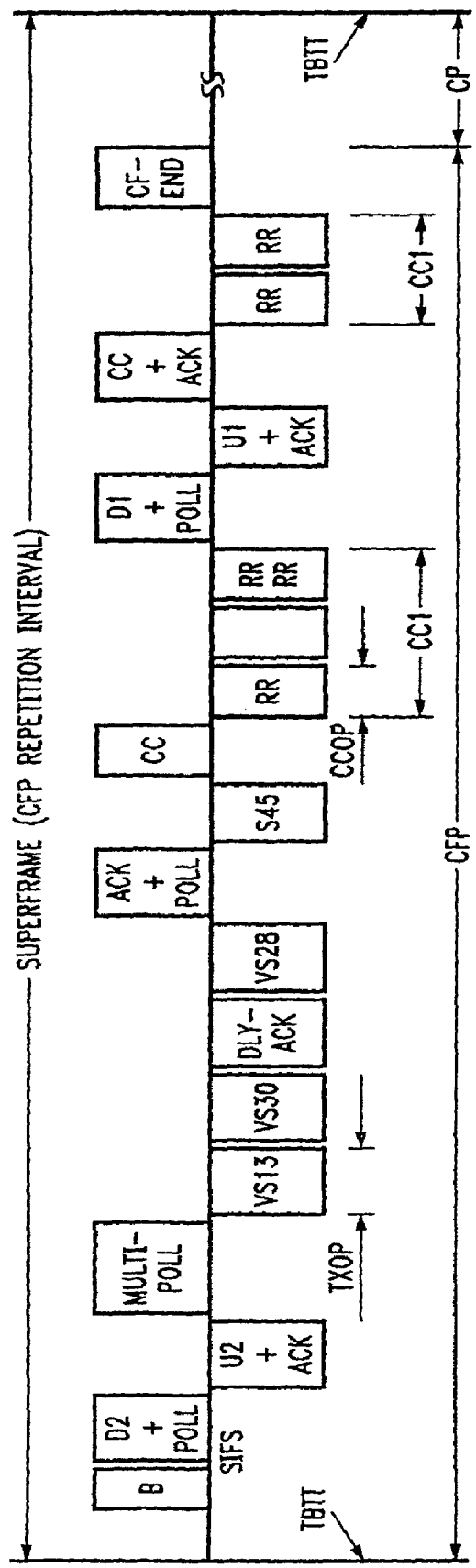
FIG. 10 shows a diagram for enhanced channel access mechanisms over a QoS-driven WLAN according to the present invention.

FIG. 10 is a diagram showing enhanced channel access mechanisms over a QoS-driven WLAN according to the present invention. FIG. 10 shows a superframe having a contention free period (CFP), a conventional contention period (CP) and exemplary frames illustrating the enhanced channel access mechanisms of the present invention. A superframe is demarcated by a target beacon transmission time (TBTT). Subsequent to the TBTT, a PC/AP STA transmits a beacon frame, as defined by IEEE P802.11/1999. A short inter-frame space (SIFS) occurs after the transmission of each frame in the CFP, also as defined by IEEE P802.11/1999.

Next in FIG. 10, a down-stream frame D2 is sent from a PC/AP STA to a non-PC/AP STA. The down-stream frame includes a poll for the destination non-PC/AP STA for sending upstream traffic to the PC/AP STA. The polled non-PC/AP STA responds with an up-stream frame U2 that contains user or management data and an acknowledgement to the poll.

An exemplary multipoll frame is shown next that conveys a sequence of TOs for non-PC STA(s) to send traffic. In this case, there is a sequence of four TOs that are identified by the multipoll. The first TO has been allocated to VS13 or a different VS sourced by a non-PC/AP STA and is used for sending data frames classified to VS13. The second TO has been allocated to VS31 or a different VS sourced by a non-PC/AP STA and is used for sending data frames classified to VS31. The third TO has been allocated to a non-PC/AP STA and is used by the non-PC/AP STA to send a delayed acknowledgement (Dly-Ack) that acknowledges receipt of frames identified in the Dly-Ack frame by the non-PC/AP STA at some previous time. The fourth TO has been allocated to VS28 or a different VS sourced by a non-PC/AP STA and is used for sending data frames classified to VS28. Traffic is sent into each respective TO. Subsequent to the TOs, the PC/AP STA sends an acknowledgement frame with a poll. The acknowledgement frame acknowledges correct reception of a frame sent immediately before the acknowledgement frame by a non-PC/AP STA (i.e., the frame from VS28 according to the illustration in FIG. 10), and the poll polls a destination non-PC/AP STA for sending upstream or sidestream traffic. The polled non-PC/AP STA, STA 4, responds by sending a data frame to STA 5 (S45).

The CFP then includes a CC frame identifying three CCOs that can be used by non-PC STAs having new bursts of traffic of a discontinuous/bursty flow type or of a best effort/asynchronous nature to transmit for sending an RR. The CC frame also includes information relating to the identification of non-PC/AP STAs that successfully sent an RR in a preceding CCI to the PC/AP STA, so that these non-PC STAs can determine whether an RR needs to be re-sent in the next CCI. An RR is sent for having bandwidth allocated for transmitting the burst of traffic, as defined above, that arrives at a non-PC/AP STA for transmission. In the exemplary arrangement of FIG. 10, a single RR is sent into the first CCO, no RR is sent into the second CCO, and two colliding RRs are sent into the third CCO. Following the CCOs, the PC/AP STA sends a downstream frame D1 with a poll, and the polled non-PC/AP STA responds with an up-stream frame U1 in which an acknowledgement is included.

In the exemplary arrangement of the superframe shown in FIG. 10, a second CC frame is sent from the PC/AP STA indicating available CCOs and acknowledging receipt of a frame immediately prior to the transmission of the CC frame. As shown in FIG. 10, a RR is sent into the first available CCO whereas another RR is sent into the second available CCO. In the illustration of FIG. 10, these two RRs collided in the third CCO of the preceding CCI, but they are now sent without collision and each received correctly by the PC/AP STA, thereby successfully resolving a collision. Lastly, a contention free (CF) end frame is sent indicating the end of the CFP and the beginning of the conventional CP in the current superframe.

The present invention also provides a technique for implementing centralized contention and reservation request over a QoS-driven WLAN that enables stations of a given BSS to report to a PC/AP of the BSS in an efficient way arrivals of new QoS or best-effort traffic bursts awaiting transmission. The FSE of the PC/AP can then place such information in its scheduling table for allocating transmission opportunities (TOs) for sending the data bursts.

Figure 11A:
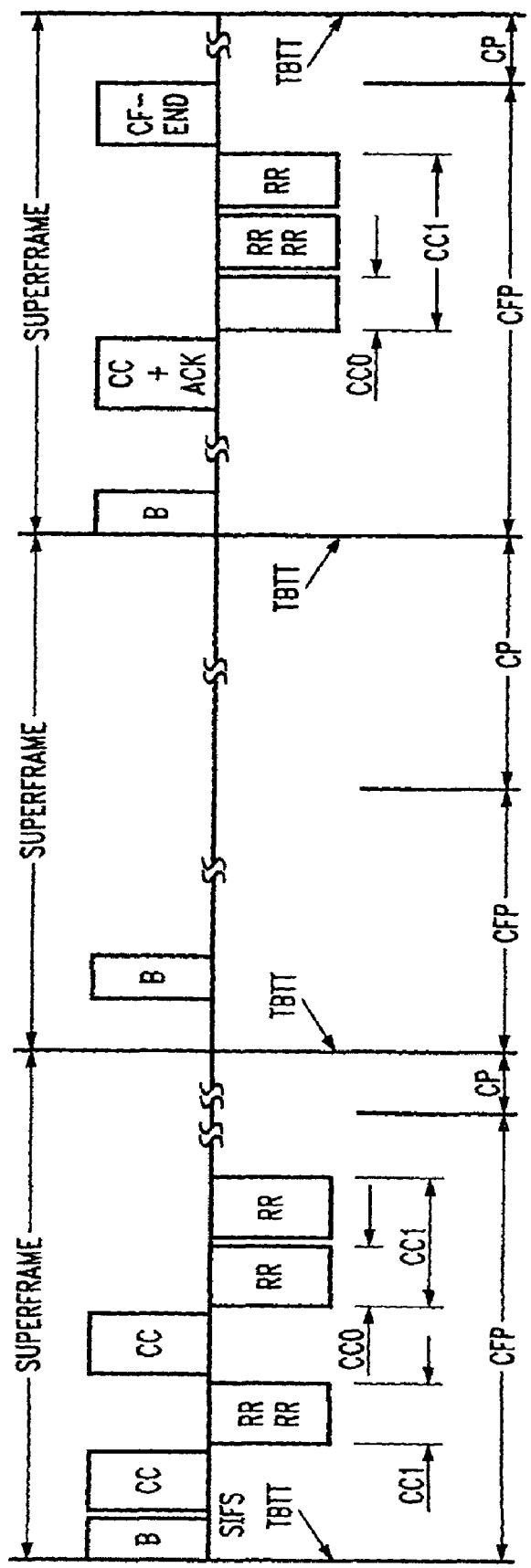

Centralized contention is controlled by the PC/AP, and occurs in the "contention-free period" (CFP) of a superframe, as shown in FIG. 11a, in contrast to a conventional contention-period (CP) that is used for conventional distributed contention. According to the invention, centralized contention occurs in well defined centralized contention intervals (CCIs). Each CCI is always preceded by a contention control (CC) frame that is broadcast by the PC/AP (or by a CC frame containing an acknowledgment to the last data frame received by the PC). Each CCI contains a number of centralized contention opportunities (CCOs) for sending reservation request (RR) frames. Subject to certain centralized contention rules, stations send their respective RR frames using CCOs. There may be zero, one, or more CCIs in a given CFP, with the number of CCOs in each CCI selected, as seen fit by the FSE in consultation with the scheduling table maintained by the FSE of the PC/AP and the centralized contention algorithm in use. A centralized contention algorithm determines the desired length of the following CCI in units of CCOs, based on the contention outcome (i.e., the number of idle, successful, and colliding CCOs) in the preceding CCI and on the estimate of the number of stations generating a new RR frame since the last CCI.

A CC frame, such as shown in FIG. 11b, contains information, such as a priority limit, a CCI length, a permission probability (PP), and feedback entries. The priority limit specifies the minimum priority level of a virtual up-stream or a virtual side-stream having a new data burst for transmission that has a privilege to trigger its sourcing station to send an RR frame on its behalf in the following CCI. A CCI length is expressed in terms of the CCOs contained in the CCI. A PP is used for reducing contention when the available CCI length is shorter than the optimum CCI length, and is calculated in such cases by dividing the available CCI length by the optimum CCI length. Otherwise, the PP is set to unity. Stations having an obligation and a privilege to send an RR frame first check against the PP to test whether they are permitted to contend for sending an RR frame. These particular stations independently generate a number from a random variable uniformly distributed over the interval (0,1). When a station generates a number smaller than the PP, the station is permitted to contend, and not otherwise. Permitted stations independently and in a random fashion select one of the available CCOs and send their RR frames using their selected CCOs. The feedback entries contain the VSIDs or AIDs for which an RR frame was correctly received by the PC/AP during the last CCI. Stations that find no such positive feedback during the CC frame will retry to send an RR frame during the next CCI under the centralized contention rules applied to that the next CCI, unless a station is offered prior to the start of the next CCI a transmission opportunity (TO) for the virtual stream (VS), resulting in the sending of the RR frame.

An RR frame, such as shown in FIG. 11c, primarily contains information, such as a data size of the VS for which the RR frame is being sent, and a VSID identifying the VS, or a data size of the best-effort traffic and the AID of the sending station. A station generates an RR frame when a new burst of data is classified to one of its sourced VSs for transmission. A station may also send an RR frame using a TO allocated to the station. RR frames are generally much shorter than data frames, and hence considerably reduce contention and improve channel performance in comparison with cases where all data frames are sent by contention as under the conventional distributed contention function (DCF) of IEEE P802.11/1999.

The present invention provides a technique for implementing multipoll over a QoS-driven WLAN that allows for transmissions from a sequence of virtual up-streams (VUSs) and virtual side-streams (VSSs) at one or more stations by a single poll. According to the invention, such a multipoll scheme extends the conventional simple poll scheme that allows for transmission from only one station per poll, as defined by IEEE P802.11/1999, thus greatly improving bandwidth utilization efficiency of wireless medium. The approach of the present invention is particularly useful when direct station-to-station communication is involved because data frames need not to be sent to a PC/AP first and then back to the destination station(s).

A multipoll is sent by a PC/AP during the CFP of a superframe when it is desirable to allocate a sequence of transmission opportunities (TOs) to various stations for sequential up-stream and/or side-stream data transmissions. A multipoll frame is primarily formed based on poll records arranged in the order of their occurrence, with each poll record further comprised of a VSID (or AID, association ID) and a duration time. The VSID identifies a VUS/VSS sourced by the station that is receiving a TO from a particular poll record, or the AID of the station in situations when the TO is for a station sourcing no active VUSs/VSSs. The duration time of a TO specifies the maximum length of the TO. The first TO starts a SIFS period after the multipoll frame ends, and each successive TO starts when the preceding TO limit expires. Alternatively, a TO starts a SIFS period after the station using the preceding TO sends a data frame that is indicated to be the final frame from that station for its poll record, when the station using the second-in-time TO detects such an indication. That is, when a station does not detect the transmission termination, as indicated by the preceding station, the station starts its transmission within TO allocated to the station. When a station detects such a termination before the preceding TO is fully utilized, the station may start early, but cannot use the leftover duration time in addition to the full duration of TO allocated to the station. In such a situation, the PC/AP does not take any action to reclaim the unused channel time. When some stations do not completely use their TOs allocated in a multipoll, the last station may end its transmission prior to the nominal expiry time, and the unused channel time is then returned to the PC/AP for reallocation.

A station, in response to a poll record containing a VSID, may transmit data from the indicated VUS/VSS or, alternatively, from a different one, as determined by its local FSE based on the QoS parameter values of the active VUSs/VSSs sourced by the station. When a poll record contains an AID, the station having the AID transmits data completely based on the decision of its local FSE, again, in accordance with the QoS parameter values of the active VUSs/VSSs.

Figure 12A:
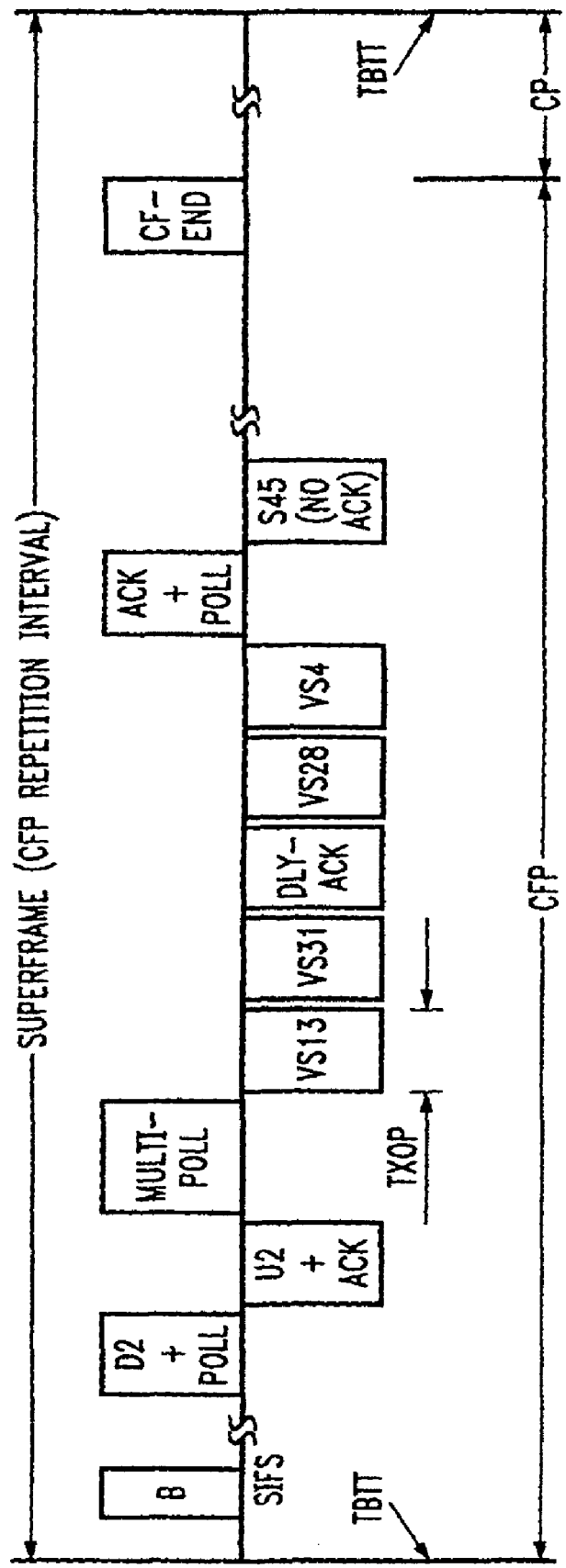
FIGS. 12a and 12b respectively show exemplary arrangements for a superframe and a multipoll that can be used over a QoS-driven WLAN according to the present invention.
Figure 12B:
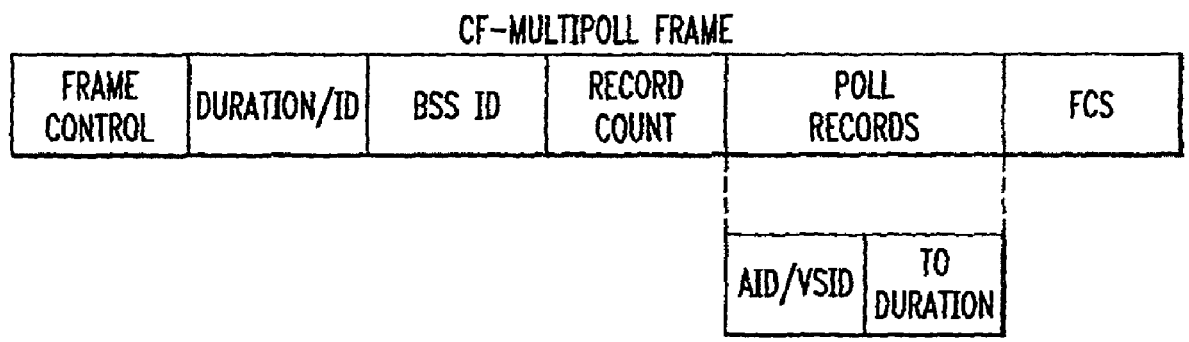

FIG. 12a shows an exemplary arrangement of a superframe having a contention free period (CFP), a conventional contention period (CP) and an exemplary arrangement of frames. The superframe of FIG. 12a is demarcated by a target beacon transmission time (TBTT). Subsequent to the TBTT, a PC/AP STA transmits a beacon frame, as defined by IEEE P802.11/1999. A short inter-frame space (SIFS) occurs after the transmission of each frame in the CFP, also as defined by IEEE P802.11/1999.

Next in FIG. 12a, a down-stream frame D2 is sent from a PC/AP STA to a non-PC/AP STA. The down-stream frame includes a poll for the destination non-PC/AP STA for sending upstream traffic to the PC/AP STA. The polled non-PC/AP STA responds with an up-stream frame U2 that contains user or management data and an acknowledgement to the poll.

An exemplary multipoll frame is shown next that conveys a sequence of TOs for non-PC STA(s) to send traffic. In this case, there is a sequence of five TOs that are identified by the multipoll. The first TO has been allocated to VS13 or a different VS sourced by a non-PC/AP STA and is used for sending data frames classified to VS13. The second TO has been allocated to VS31 or a different VS sourced by a non-PC/AP STA and is used for sending data frames classified to VS31. The third TO has been allocated to a non-PC/AP STA and is used by the non-PC/AP STA to send a delayed acknowledgement (Dly-Ack) that acknowledges receipt of frames identified in the Dly-Ack frame by the non-PC/AP STA at some previous time. The fourth TO has been allocated to VS28 or a different VS sourced by a non-PC/AP STA and is used for sending data frames classified to VS28. The fifth TO has been allocated to VS4 or a different VS sourced by a non-PC/AP STA and is used for sending data frames classified to VS4. Traffic is sent into each respective TO. Subsequent to the TOs, the PC/AP STA sends an acknowledgement frame with a poll. The acknowledgement frame acknowledges correct reception of a frame sent immediately before the acknowledgement frame by a non-PC/AP STA (i.e., the frame from STA 4 according to the illustration in FIG. 12*a*), and the poll polls a destination non-PC/AP STA for sending up-stream or side-stream traffic. The polled non-PC/AP STA, STA 4, responds by sending a data frame to STA 5 (S45). Lastly, a contention free (CF) end frame is sent indicating the end of the CFP and the beginning of the conventional CP in the current superframe.

While the present invention has been described in connection with the illustrated embodiments, it will be appreciated and understood that modifications may be made without departing from the true spirit and scope of the invention.

What is claimed is:

1. A virtual stream in a basic service set in a wireless local area network, the virtual stream comprising:
a path in the wireless local area network between a station sourcing a session and a station receiving the session in the same basic service set;
wherein the virtual stream is set up by a quality of service management entity within a point coordinator station of the basic service set to transport, under a predetermined quality of service constraint, a traffic of the session from a local logical link control entity to a peer logical link control entity in the same basic service set; and
wherein the point coordinator station announces multiple transmission opportunities in a single frame.

2. The virtual stream of claim 1, wherein the wireless local area network includes a distributed contention scheme under control of a distributed coordination function contained in both the station sourcing the session and the station receiving the session, and wherein the point coordinator station controls a centralized contention scheme that functions in addition to the distributed contention scheme.

3. The virtual stream of claim 1, wherein the quality of service management entity of the point coordinator station reserves an associated resource of the basic service set for the virtual stream set up for the session.

4. The virtual stream of claim 3, wherein the reserved resource is a predetermined bandwidth of a communication link of the basic service set.

5. The virtual stream of claim 1, wherein the path is defined by a virtual stream identifier, an address of the station sourcing the session, and an address of the station receiving the session.

6. The virtual stream of claim 5, wherein the virtual stream identifier is unique within, and local to, the basic service set.

7. The virtual stream of claim 1, wherein the virtual stream exists solely within a medium access control sub layer of the wireless network.

8. The virtual stream of claim 1, wherein the quality of service management entity of the point coordinator station releases an associated resource of the basic service set reserved for the virtual stream, when the virtual stream is torn down at a termination of the session.

9. The virtual stream of claim 1, wherein the virtual stream is a virtual down-stream, wherein the station sourcing the session is a the point coordinator station of the basic service set, and wherein the station receiving the session is a non-point coordinator station of the basic service set.

10. The virtual stream of claim 1, wherein the virtual stream is a virtual up-stream, wherein the station sourcing the session is a non-point coordinator station of the basic service set, and wherein the station receiving the session is the point coordinator station of the basic service set.

11. The virtual stream of claim 1, wherein the virtual stream is a virtual side-stream, wherein the station sourcing the session is a non-point coordinator station of the basic service set, and wherein the station receiving the session is a non-point coordinator station of the basic service set.

12. The virtual stream of claim 1, wherein the virtual stream is a unicast virtual stream, wherein the station sourcing the session is the point coordinator station of the basic service set, and wherein the station receiving the session is a non-point coordinator station of the basic service set.

13. The virtual stream of claim 1, wherein the virtual stream is a multicast virtual stream, wherein the station sourcing the session is the point coordinator station of the basic service set, and wherein a plurality of stations of the same basic service set receive the session.

14. A virtual stream in a basic service set in a wireless local area network, the virtual stream comprising:
a path in the wireless local area network between a station sourcing a session and a station receiving the session in the same basic service set;
wherein the virtual stream is set up by a quality of service management entity within a point coordinator station of the basic service set to transport, under a predetermined quality of service constraint, a traffic of the session from a local logical link control entity to a peer logical link control entity in the same basic service set;
wherein the wireless local area network includes a distributed contention scheme under control of a distributed coordination function contained in both the station sourcing the session and the station receiving the session, and the point coordinator station controls a centralized contention scheme that functions in addition to the distributed contention scheme; and
wherein the virtual stream comprises a unicast virtual stream.

15. The virtual stream of claim 14, wherein the virtual stream is a virtual down-stream, wherein the station sourcing the session is the point coordinator station of the basic service set, and wherein the station receiving the session is a non-point coordinator station of the basic service set.

16. The virtual stream of claim 14, wherein the virtual stream is a virtual up-stream, wherein the station sourcing the session is a non-point coordinator station of the basic service set, and wherein the station receiving the session is the point coordinator station of the basic service set.

17. The virtual stream of claim 14, wherein the virtual stream is a virtual side-stream, wherein the station sourcing the session is a non-point coordinator station of the basic service set, and wherein the station receiving the session is a non-point coordinator station of the basic service set.

18. A virtual stream in a basic service set in a wireless local area network, the virtual stream comprising;
a path in the wireless local area network between a station sourcing a session and a station receiving the session in the same basic service set;
wherein the virtual stream is set up by a quality of service management entity within a point coordinator station of the basic service set to transport, under a predetermined quality of service constraint, a traffic of the session from a local logical link control entity to a peer logical link control entity in the same basic service set;
wherein the wireless local area network includes a distributed contention scheme under control of a distributed coordination function contained in both the station sourcing the session and the station receiving the session, and the point coordinator station controls a centralized contention scheme that functions in addition to the distributed contention scheme; and wherein the virtual stream comprises a multicast virtual stream.

19. The virtual stream of claim 18, wherein the virtual stream is a virtual down-stream, wherein the station sourcing the session is the point coordinator station of the basic service set; and wherein the station receiving the session is a non-point coordinator station of the basic service set.

20. The virtual stream of claim 18, wherein the virtual stream is a virtual up-stream, wherein the station sourcing the session is a non-point coordinator station of the basic service set, and wherein the station receiving the session is the point coordinator station of the basic service set.

* * * * *